United States Patent
Tatsuta et al.

(10) Patent No.: US 10,128,656 B2
(45) Date of Patent: Nov. 13, 2018

(54) POWER ASSIST UNIT AND POWER ASSIST SYSTEM

(71) Applicant: SAMSUNG SDI CO., LTD., Yongin-si, Gyeonggi-do (KR)

(72) Inventors: Toshiki Tatsuta, Osaka (JP); Makoto Yatsu, Osaka (JP); Tetsuhiro Ishikawa, Cheonan-si (KR); Yoshiaki Okui, Cheonan-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 565 days.

(21) Appl. No.: 14/729,156

(22) Filed: Jun. 3, 2015

(65) Prior Publication Data

US 2015/0364921 A1 Dec. 17, 2015

(30) Foreign Application Priority Data

Jun. 17, 2014 (JP) .................................. 2014-124263
Jan. 27, 2015 (KR) ........................ 10-2015-0013050

(51) Int. Cl.
  *H02J 3/32* (2006.01)
  *H02J 3/38* (2006.01)
  *H02J 7/00* (2006.01)

(52) U.S. Cl.
  CPC ................ *H02J 3/32* (2013.01); *H02J 3/386* (2013.01); *H02J 3/383* (2013.01); *H02J 7/0013* (2013.01);
  (Continued)

(58) Field of Classification Search
  CPC .... H02J 3/32; H02J 3/386; H02J 3/382; H02J 3/383; H02J 7/0013; H02J 2007/0067;
  (Continued)

(56) References Cited

U.S. PATENT DOCUMENTS 8,996,191 B2 * 3/2015 Carlson ............. H01L 31/02021
                                                    700/286
9,077,204 B2 * 7/2015 More .................... F03D 7/0284
(Continued)

FOREIGN PATENT DOCUMENTS

CN         102625970 A     8/2012
JP         2001-157382     6/2001
(Continued)

OTHER PUBLICATIONS

Advisory Committee for Natural resources and Energy New Energy Subcommittee wind power system inter connection measures subcommittee, Apr. 2009; "Accurate check of the possibility of a wind power generation association viewed from a change of frequency", [online], Apr. 21, 2009, New Energy Solution of Resource Energy Office of Economy Industry Agency, and [Search, May 9, Heisei26] <URL:http://www.meti.go.jp/committee/materials /g50426aj.html>.
(Continued)

*Primary Examiner* — Ryan Johnson
(74) *Attorney, Agent, or Firm* — Lee & Morse, P.C.

(57) ABSTRACT

A power assist apparatus includes a branch power lines, a first power storage device, a power assist converter, and a second power storage device. The branch power line is connected to a main line of a natural energy power generation system, which is connected to a system. The first power storage device connected to the branch power line. The power assist converter connected to the branch power line. The second power storage device connected to a downstream side of the power assist converter.

17 Claims, 37 Drawing Sheets

(52) U.S. Cl.
CPC ..... *H02J 2007/0067* (2013.01); *Y02E 10/563* (2013.01); *Y02E 10/566* (2013.01); *Y02E 10/763* (2013.01); *Y02E 10/766* (2013.01); *Y02E 70/30* (2013.01); *Y10T 307/50* (2015.04); *Y10T 307/675* (2015.04); *Y10T 307/696* (2015.04); *Y10T 307/707* (2015.04)

(58) Field of Classification Search
CPC ........ H02J 7/34; Y02E 10/566; Y02E 10/766; Y02E 10/763; Y02E 10/563; Y02E 70/30
See application file for complete search history.

(56) References Cited

U.S. PATENT DOCUMENTS

| | | | |
|---|---|---|---|
| 2013/0009485 A1 | 1/2013 | Sakuma et al. | |
| 2013/0043825 A1 | 2/2013 | Diedrichs et al. | |
| 2014/0285010 A1* | 9/2014 | Cameron | H02J 1/14 307/29 |
| 2015/0105923 A1* | 4/2015 | Beekmann | H02J 3/24 700/287 |
| 2015/0270731 A1* | 9/2015 | Adelmann | H02J 7/35 320/101 |
| 2015/0333524 A1* | 11/2015 | Nishikawa | H02J 3/32 307/26 |
| 2016/0020613 A1* | 1/2016 | Kimura | H02J 3/32 307/52 |

FOREIGN PATENT DOCUMENTS

| | | |
|---|---|---|
| JP | 2002-349417 | 12/2002 |
| JP | 2006-311707 | 11/2006 |
| JP | 2007-116825 | 5/2007 |
| JP | 2008-099527 | 4/2008 |
| JP | 2008-131736 | 6/2008 |
| JP | 2009-247108 | 10/2009 |
| JP | 2011-234563 | 11/2011 |
| JP | 2012-228028 | 11/2012 |
| JP | 2014-096940 | 5/2014 |
| JP | 2015-033307 | 2/2015 |
| KR | 10-2013-0047197 A | 5/2013 |
| WO | WO 2011/135891 A1 | 11/2011 |
| WO | WO 2014/033505 A1 | 3/2014 |

OTHER PUBLICATIONS

Japanese Office Action dated Mar. 19, 2018.
Chinese Office Action dated Sep. 7, 2018.

* cited by examiner

POWER ASSIST UNIT AND POWER ASSIST SYSTEM

CROSS-REFERENCE TO RELATED APPLICATIONS

Japanese Patent Application No. 2014-124263, filed on Jun. 17, 2014, and Korean Patent Application No. 10-2015-0013050, filed on Jan. 27, 2015, and entitled, "Power Assist Unit and Power Assist System," are incorporated by reference herein in their entirety.

BACKGROUND

1. Field

One or more embodiments herein relate to a power assist unit and system.

2. Description of the Related Art

The efficient harnessing of power form solar, wind, and other of natural energy sources continues to be of interest. The generation of power from natural energy sources tends to be unstable and erratic because of their dependence on the weather or environmental conditions.

A variety of approaches have been proposed to increase the efficiency of power generation systems based on natural energy sources. One approach involves using a storage cell system. For example, a power transmission line may be used to send power generated by a wind power generator to a power system via a transformer. A capacitor-based storage cell system may be coupled to the transmission line via the transformer.

However, this approach is unable to reliably supply power because of varying weather conditions. Also, it is difficult to accurately predict the required capacity of the storage cells using this approach. Also, this approach performs charging and discharging operations at a high rate in order to account for changes in output power, e.g., because the charging and discharging time for cells of the storage cell system tends to be short, the number of times of charging and discharging is performed is increased. Also, the life cycles of the storage cells deteriorates over time because the load on the storage cells increases as a result of performing charging and discharging operations at a high rate.

Another approach involves using rechargeable batteries between a power source and load. A power compensation operation is then continuously performed on the rechargeable batteries. For example, the rechargeable batteries are divided into a first group used for a permanent power compensation operation and a second group used for a power compensation operation. The second group of rechargeable batteries may be used in place of rechargeable batteries in the first group when required, and are recovered and charged when the rechargeable batteries of the first group are recovered and charged.

However, the permanent power compensation operation is used only in rechargeable batteries of the first group. Also, because charging and discharging operations are performed at a high rate in order to account for changes in output power, the life cycles of the rechargeable batteries of the first group deteriorate because the batteries in the first group are continuously used. Also, the number of cells and the required storage capacity increases costs.

Another approach involves using a DC feed power system that includes storage devices connected to a DC bus. The storage devices perform charging and discharging operations based on power from the DC bus. However, it is difficult to perform charging and discharging operations at a high rate using this approach because the load is directly connected to the DC bus.

SUMMARY

In accordance with one or more embodiments, a power assist apparatus includes a branch power line connected to a main line of a natural energy power generation system which is connected to a first system; a first power storage device connected to the branch power line; a power assist DC/DC converter connected to the branch power line; and a second power storage device connected to a downstream side of the power assist DC/DC converter.

The natural energy power generation system may include a rotating body rotated by natural energy, a synchronous power generator to be driven by the rotating body, and a power converter between the synchronous power generator and the system, the power converter includes a first inverter to perform AC/DC conversion and a second inverter to perform DC/AC conversion, the first and second inverter connected in series, and the branch power line is connected to a DC main line connecting the first and second inverters.

The natural energy power generation system may include a rotating body rotated by natural energy, an induction power generator to be driven by the rotating body, and a power converter in a secondary winding of the induction power generator, the power converter includes a first inverter to perform AC/DC conversion and a second inverter to perform DC/AC conversion, the and second inverters connected in series, and the branch power line is connected to a DC main line connecting the first and second inverters.

The main line may include an AC main line and the power assist apparatus includes an inverter connected to the AC main line, the branch power line connected to a downstream side of the inverter and to the AC main line through the inverter. The first power storage device may have a higher output voltage than the second power storage device.

The apparatus may include a DC circuit breaker in a power line corresponding to power lines after a branch from the branch power line, the DC circuit breaker placed on the first power storage device side to electrically conduct or cut off the first power storage device and the branch power line.

The inverter may be connected to a second system different from the first system, and when power supplied from the natural energy power generation system to the first system is stopped or power supplied to the first system is stopped, the power may be supplied from at least one of the first power storage device or the second power storage device to the second system through the inverter.

The natural energy power generation system may include a general controller to output a general control signal to control charging and discharging of the first power storage device and the second power storage device; an interface to receive the general control signal, generate a first cell control signal to control the charging and discharging of the first power storage device based on the general control signal, output the first cell control signal to the first power storage device, generate a second cell control signal to control the charging and discharging of the second power storage device, and output the second cell control signal to the second power storage device, and wherein: first charging and discharging control and second charging and discharging control may be controlled so that the first charging and discharging control and the second charging and discharging control are alternately selected, wherein the first charging and discharging control and the second charging and discharging control may be controlled by the general controller through the interface unit, and wherein: the first charging and discharging control may include charging and discharging a first device of the first power storage device and the second power storage device when driven and simultaneously charging and discharging a second device of the first power storage device and the second power storage device when stopped, and the second charging and discharging control may include charging and discharging the second device when driven and simultaneously charging and discharging the first device when stopped.

The general control signal output by the general controller may include a converter control command to perform on/off control on the power assist DC/DC converter, and the interface may output a converter control signal to control the power assist DC/DC converter to the power assist DC/DC converter based on the converter control command.

In accordance with one or more other embodiments, a power assist system includes a power assist apparatus in accordance with one or more embodiments described herein, a general controller to control charging and discharging of the first power storage device and the second power storage device, the general controller is to alternately perform first charging and discharging control and second charging and discharging control, wherein: the first charging and discharging control includes charging and discharging a first device of the first power storage device and the second power storage device when driven and simultaneously charging and discharging a second device of the first power storage device and the second power storage device when stopped, and the second charging and discharging control includes charging and discharging of the second device when driven and simultaneously the charging and discharging of the first device when stopped.

The general controller may charge and discharge the first device and stop the charging and discharging of the second device so that SOC becomes Q1% or less in the first charging and discharging control, and charge and discharge the second device and stop the charging and discharging of the first device so that the SOC becomes Q2% or less in the second charging and discharging control, wherein Q1=50 and Q1<Q2=100 are satisfied, and wherein a time of the second charging and discharging control is less than a time of the first charging and discharging control.

In accordance with one or more other embodiments, a power assist system includes a power assist unit in accordance with one or more embodiments described herein, a general controller to control charging and discharging of the first power storage device and the second power storage device, wherein the general controller is alternately perform first charging and discharging control and second charging and discharging control, wherein: in the first charging and discharging control, a first device of the first power storage device and the second power storage device is charged and discharged so that the first device has SOC of Q1% or less, where Q1=50 is satisfied, and charging and discharging of a second device of the first power storage device and the second power storage device are stopped, and in the second charging and discharging control, the first device is charged and discharged so that Q1+Q2=100 is satisfied and the SOC of the first device becomes Q1% or less, and the second device is charged and discharged so that the SOC of the second device becomes Q1% or more to Q2% or less.

In accordance with one or more other embodiments, a power assist system a power assist unit in accordance with one or more of the embodiments described herein, a general controller to control charging and discharging of the first power storage device and the second power storage device, wherein the general controller is to alternately perform first charging and discharging control and second charging and discharging control, wherein: in the first charging and discharging control, a first device of the first power storage device and the second power storage device is charged and discharged so that the first device has SOC of Q1% or less, where Q1=50 is satisfied, and charging and discharging of a second device of the first power storage device and the second power storage device are stopped, and in the second charging and discharging control, the first device is charged and discharged so that Q1+Q2=100 is satisfied and the SOC of the first device becomes Q1% or less, and the second device is charged and discharged so that the SOC of the second device becomes Q1% or more to Q2% or less.

The general controller may receive a power monitoring signal indicative of a state of the generated power, and calculate a charging and discharging command waveform corresponding to assist power of the branch power line based on the power monitoring signal and perform the first charging and discharging control and the second charging and discharging control so that a charging and discharging waveform of the branch power line becomes the charging and discharging command waveform.

The general controller may segment a triangle wave approximation based on a combination of triangle waves and square waves having an amplitude and a charging and discharging cycle calculated based on the power monitoring signal, generate a first charging and discharging command to be applied to the first charging and discharging control and a second charging and discharging command to be applied to the second charging and discharging control and to control the first power storage device and the second power storage device.

The general controller may receive a power monitoring signal indicative of a state of the power, calculate a charging and discharging command waveform of a triangle wave corresponding to assist power of the branch power line based on the power monitoring signal, segment the triangle wave into a first charging and discharging command to be applied to the first charging and discharging control and a second charging and discharging command to be applied to the second charging and discharging control, and control the first and second power storage devices.

The general controller may perform third charging and discharging control in which Q1=50, a first device of the first power storage device and the second power storage device is charged and discharged so that SOC of the first device becomes Q1% or less, and simultaneously charging and discharging of the second device are stopped, fourth charging and discharging control in which Q1+Q2=100, the first device is charged and discharged so that the SOC of the first device becomes Q1% or less, and simultaneously the second device is charged and discharged so that the SOC of the second device becomes Q1% or more to Q2% or less, and fifth charging and discharging control in which the first charging and discharging control and the second charging and discharging control are combined and sixth charging and discharging control in which the third charging and discharging control and the fourth charging and discharging control are combined at a predetermined ratio.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

First Embodiment

Figure 1:
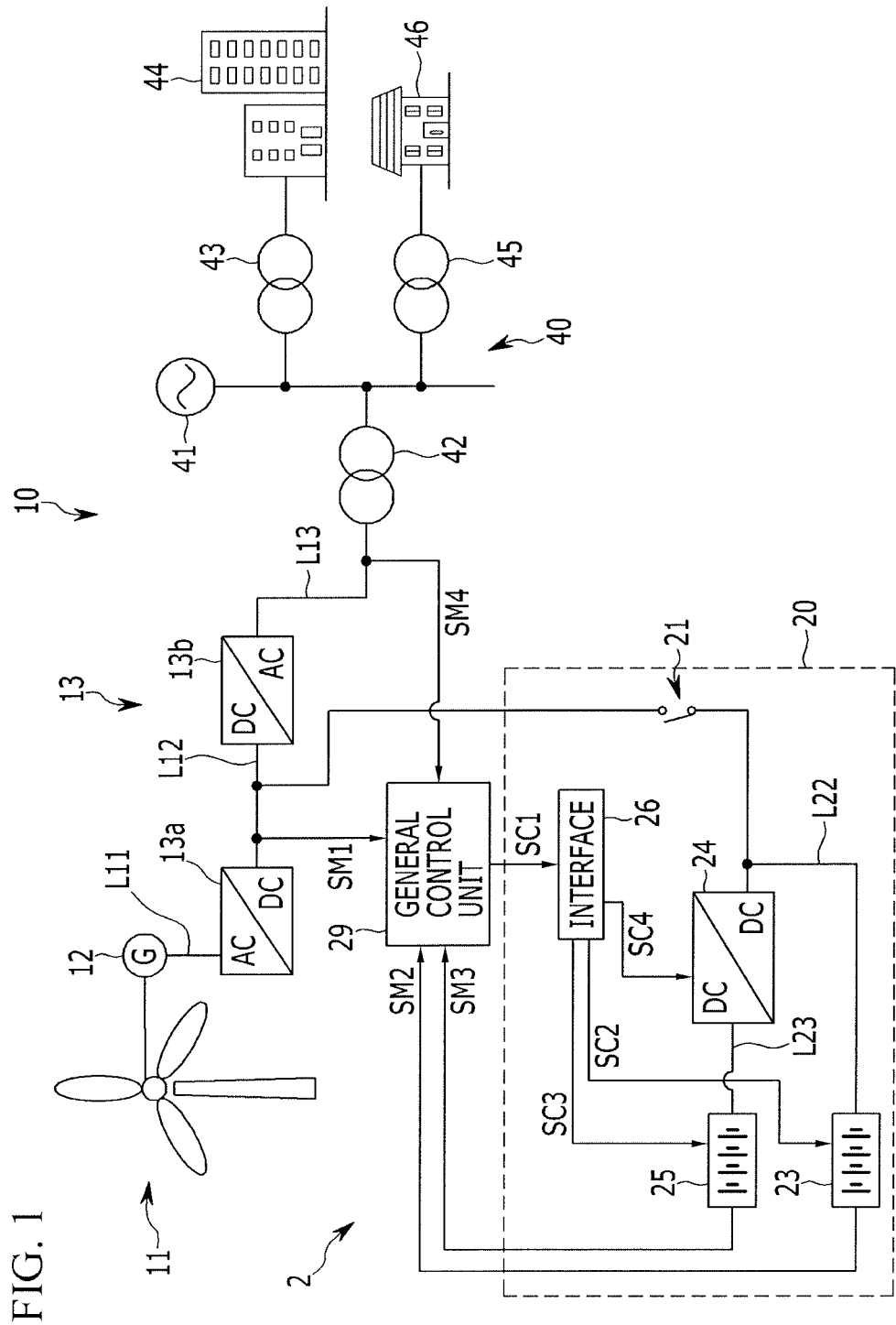
FIG. 1 illustrates an embodiment of a wind power generation system and a power assist system.

FIG. 1 illustrates an embodiment of a wind power generation system 10 and a power assist system 2. The wind power generation system 10 is a natural energy power generation system connected to a system 40. The wind power generation system 10 includes a windmill 11 (e.g., a body rotated by the wind,) a synchronous power generator 12 connected to the rotation shaft of the windmill 11 and driven by the rotating body, and a power conversion unit 13 to convert power generated by the synchronous power generator 12.

The power conversion unit 13 includes a first power generation system inverter 13a and a second power generation system inverter 13b. The first power generation system inverter 13a receives AC power generated by the synchronous power generator 12 via a main line L11, converts the AC power to DC power (e.g., AC/DC conversion), and outputs the DC power to a main line L12. The second power generation system inverter 13b converts the DC power of the main line L12 to AC power (e.g., DC/AC conversion) and outputs the AC power to a main line L13.

The main line L13 is connected to the system 40 with a transformer 42 interposed therebetween. Accordingly, the output power of the wind power generation system 10 is transformed by the transformer 42 and supplied to the system 40. Power supplied by the wind power generation system 10 and a power source 41 for the system is supplied to a factory 44 or a home 46 through a transformer 43 or transformer 45.

A power assist system 2 includes a power assist unit 20 connected to the main line L12 of the wind power generation system 10 and a general control unit 29 configured to generally control the power assist unit 20.

The power assist unit 20 includes a circuit breaker 21 having one end connected to the main line L12 of the wind power generation system 10, a branch power line L22 connected to the other end of the circuit breaker 21, a first cell bank 23 that is a first power storage device connected to the branch power line L22, a power assist DC/DC converter 24 connected to the branch power line L22, a second cell bank 25 that is a second power storage device connected to the downstream side of the power assist DC/DC converter 24 through a power line L23, and an interface unit 26.

In an exemplary embodiment, in the case of the power assist unit 20, the side close to the main line L12 is called an upstream side and the side distant from the main line L12 is called a downstream side.

The circuit breaker 21 changes cut-off/conduction between the main line L12 of the wind power generation system 10 and the branch power line L22 of the power assist unit 20. When the power assist unit 20 performs a power assist operation (e.g., when the first cell bank 23 and/or the second cell bank 25 perform charging and discharging), the circuit breaker 21 conducts the main line L12 and the branch power line L22.

If an overcurrent is generated or an abnormality is generated (e.g., if an abnormal voltage is generated due to a lightning strike) on one side, the circuit breaker 21 cuts off the connection between the main line L12 and the branch power line L22 automatically or under the control of the general control unit 29 (through a control signal line that is not illustrated).

The first cell bank 23 corresponds to charging and discharging of a high rate, and may be formed of, for example, lithium ion cells. The first cell bank 23 has the same terminal voltage as that of the main line L12 of the wind power generation system 10, e.g., the terminal voltage of the first cell bank 23 may be 800 V.

The second cell bank 25 is configured to correspond to charging and discharging of a high rate, and may be formed of for example, lithium ion cells. The second cell bank 25 may have the same or different terminal voltage as the first cell bank 23. For example, if the terminal voltage of the first cell bank 23 is 800 V, the second cell bank 25 may be configured to have a terminal voltage of 3 V or more and 600 V or less.

The terminal voltage of the first cell bank 23 or the second cell bank 25 may be predetermined by changing the type and/or number of cells used in lithium ion batteries. The terminal voltage of the second cell bank 25 may have a different voltage range in another embodiment. For example, the terminal voltage of the second cell bank 25 may be 600 V or more and may be the same as that of the first cell bank 23.

In an exemplary embodiment, the first cell bank 23 and the second cell bank 25 are formed of the lithium ion cells. In an other embodiment, the first cell bank 23 and the second cell bank 25 may be formed of different types of cells, such as but not limited to lead cells, NaS cells, and Ni—Cd cells.

The power assist DC/DC converter 24 is connected to the output terminal of the second cell bank 25, and may be connected to the branch power line L22 by raising the voltage of the output terminal. The input voltage range of the power assist DC/DC converter 24 is set within a range according to a predetermined range of the terminal voltage of the second cell bank 25. By adopting such a configuration, the storage capacity of the second cell bank 25 may be flexibly changed.

Accordingly, for example, if the entire storage capacity of the power assist unit 20 is to be changed depending on a use condition after the wind power generation system 10 and the power assist unit 20 are installed, fine control may be performed by changing the storage capacity of the power assist unit 20, for example, by changing the number of cells of the second cell bank 25.

Furthermore, since the power assist DC/DC converter 24 is installed between the first cell bank 23 and the second cell bank 25, the state in which a cell bank on one side has a high voltage and the state in which a cell bank on the other side has a high voltage are automatically alternately formed depending on a difference between the charging and discharging voltages of the first cell bank 23 and second cell bank 25 and the power assist DC/DC converter 24. In other words, a rest time is automatically alternately generated in the first cell bank 23 and the second cell bank 25.

For example, if a voltage charged and discharged by the first cell bank 23 is high, the branch power line L22 is driven by the charging and discharging of the first cell bank 23, the power assist DC/DC converter 24 becomes a barrier, and thus the charging and discharging of the second cell bank 25 are stopped. In other words, the second cell bank 25 enters a rest state.

In contrast, if a voltage charged and discharged by the second cell bank 25 is high, the branch power line L22 is driven by the charging and discharging voltage of the second cell bank 25 output through the power assist DC/DC converter 24, the power assist DC/DC converter 24 becomes a barrier and thus the charging and discharging of the first cell bank 23 is stopped. In other words, the first cell bank 23 enters a rest state.

Accordingly, in the power assist operation of the wind power generation system 10, although charging and discharging of a high rate are performed on the first cell bank 23 and the second cell bank 25, a longer life cycle of a cell may be realized compared to a case where a rest time is not generated. In the power assist unit 20 of FIG. 1, the circuit breaker 21 is optional and the same advantage may be obtained without the circuit breaker 21.

The general control unit 29 receives a first power detection signal SM1 (e.g., a power detection signal indicative of the power situation of the main line L12) before assist power according to the power assist system 2 (the power assist unit 20) is supplied, and outputs a general control signal SC1 for controlling the first cell bank 23, the power assist DC/DC converter 24, and the second cell bank 25 to the interface unit 26.

Furthermore, the general control unit 29 receives a first cell monitoring signal SM2 indicative of a cell voltage, a charging and discharging current, and charging and discharging power from the first cell bank 23, and monitors the charging and discharging situation of the first cell bank 23.

Also, the general control unit 29 receives a second cell monitoring signal SM3 indicative of a cell voltage, a charging and discharging current, and charging and discharging power from the second cell bank 25, and monitors the charging and discharging situation of the second cell bank 25.

Also, the general control unit 29 receives a second power detection signal SM4 indicative of the power situation of the main line L13 through which AC power is transmitted after the power assist of the power assist unit 20 is performed, and monitors a power situation after the power assist, that is, monitors whether a target power assist operation has been performed.

The general control unit 29 may receive a signal indicative of the situation of power of the main line L11, supplied through AC power generated by the synchronous power generator 12, as the first power detection signal SM1 instead of the power situation of the main line L12 and to output the general control signal SC1, generated based on the first power detection signal SM1, to the interface unit 26.

Power Stabilization Control (Charging and Discharging Control)

A Change of Power Generated by the Wind Power Generation System

Figure 2A:
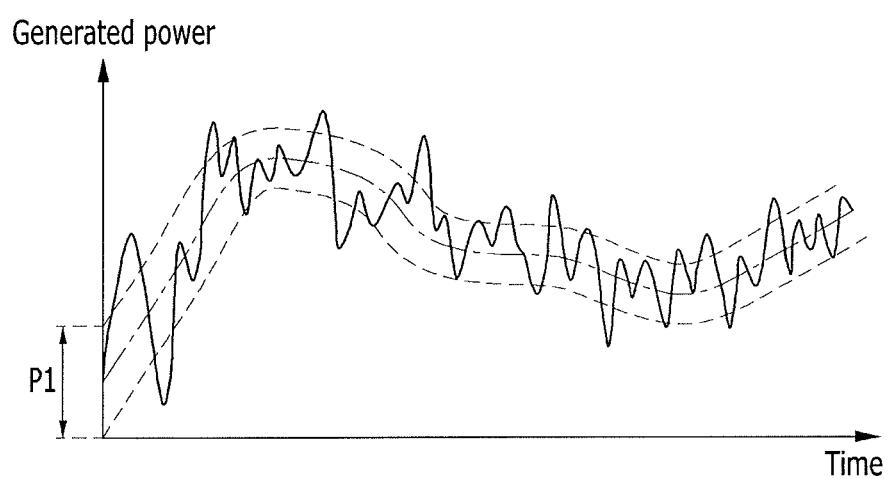
FIGS. 2A and 2B illustrate examples of the power waveform of a first power detection signal.
Figure 2B:
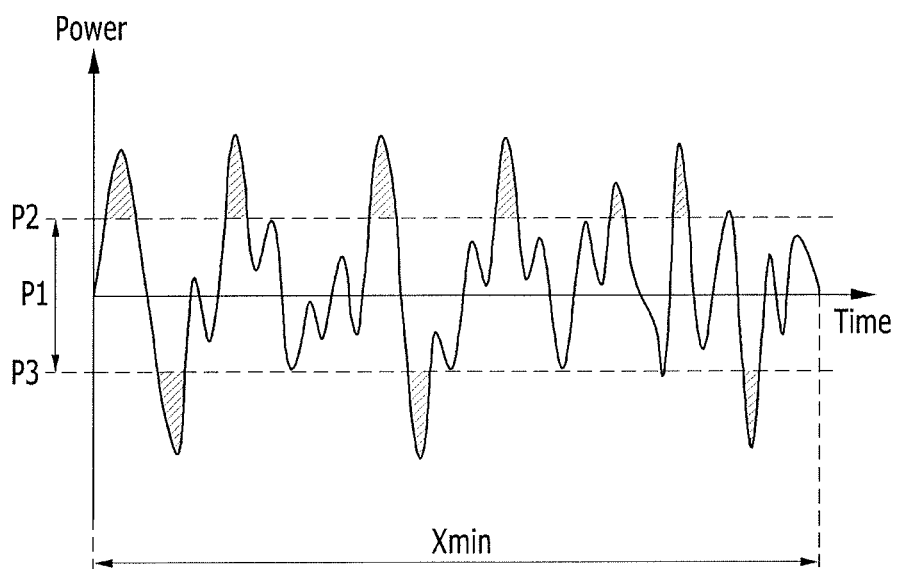

FIGS. 2A and 2B illustrates example waveforms of the first power detection signal SM1 in the wind power generation system 10 of FIG. 1. For example, FIGS. 2A and 2B illustrates examples of a power generation waveform after the power conversion is performed by power conversion unit 13 in the wind power generation system 10. In FIG. 2A, a solid line indicates the first power detection signal SM1 and chain-dashed lines are e profile waves of the wind power generation system 10.

FIG. 2B illustrates the width of change of the first power detection signal SM1 according to the profile waveform (e.g., the chain-dashed line of FIG. 2A). In FIG. 2B, the time (min) in the horizontal axis may be 20 min, for example. Also, in FIG. 2B, it is assumed that a permissible width of change of output power that may be stably supplied from the wind power generation system 10 to the system 40 is P1, an upper threshold according to a change of the output power is P2, and a lower threshold according to a change of the output power is P3. For example, if power generated by the wind power generation system is 4 MW, the value of P1 may be set to 500 kW. For example, P2 may be set to +250 kW, and P3 may be set to −250 kW. The permissible change widths P1 to P3 may be different in another embodiment.

In other words, in FIG. 2B, there may be a normal distribution relationship between the amount of the change and frequency of occurrence of a portion (e.g., a rightward upward slant line of FIG. 2B) of the change of the output power that exceeds the upper limit threshold P2 and the amount of the change and frequency of occurrence of a portion (e.g., a leftward downward slant line of FIG. 2B) of the change of the output power that is less than the lower limit threshold P3.

In accordance with one embodiment, charging and discharging commands are applied having specific patterns based on the normal distribution relationship to the general control unit 29 to the first cell bank 23 and the second cell bank 25 because the width of a change of power from the wind power generation system 10 to the system 40 is limited within a specific range (e.g., within P1).

Charging and discharging control performed by the general control unit 29 is described in detail below. In the following description, each of the first cell bank 23 and the second cell bank 25 is assumed to have a fully charged capacity 4 C. Accordingly, charging and discharging of State Of Charge (SOC) of 100% corresponds to the case where the first cell bank 23 is charged and discharged with the charging and discharging capacity 4 C. The same is true of the second cell bank 25.

Furthermore, the first cell bank 23 is charged and discharged in a section of SOC of 0% or more to 50% or less corresponds to the case where the first cell bank 23 is charged and discharged with a charging and discharging capacity of 0 C or more to 2 C or less. In this case, the SOC is a ratio of a current charging capacity to a fully charged capacity.

Furthermore, a charging capacity 1 C corresponds to the case where the current value at which a cell having a capacity of a nominal capacity value is charged in a constant current and the charging is completed in one hour. Likewise, a discharging capacity 1 C corresponds to the case where the current value at which a cell having a capacity of a nominal capacity value is discharged in a constant current and the discharging is completed in one hour.

Furthermore, charging and discharging the first cell bank 23 in a section having a charging and discharging capacity of 0 C or more to 2 C or less corresponds to the case where the first cell bank 23 is charged in a section of 0 C or more and 2 C or less and discharged in a section of 0 C or more and 2 C or less. For convenience of description, the fully charged capacity has been assumed to be 4 C, but the fully charged capacity may be 4 C or more or 4 C or less in another embodiment.

Charging and Discharging Control

First, the general control unit 29 receives the first power detection signal SM1 and calculates a charging and discharging pattern for stabilizing output power of the wind power generation system 10 based on the first power detection signal SM1. For example, the general control unit 29 compares the first power detection signal SM1 with a profile waveform, selects a predetermined pattern (waveform shape) used in a charging and discharging pattern, and simultaneously calculates a charging and discharging capacity and charging and discharging cycle applied to the charging and discharging pattern.

The waveform shape selected as the predetermined charging and discharging pattern by the general control unit 29 may include a waveform that has become close to a triangle wave by combining a square wave, a triangle wave, and a square wave, for example. Charging and discharging control is described in detail below with respect to examples of charging and discharging patterns.

First Charging and Discharging Pattern

Figure 3A:
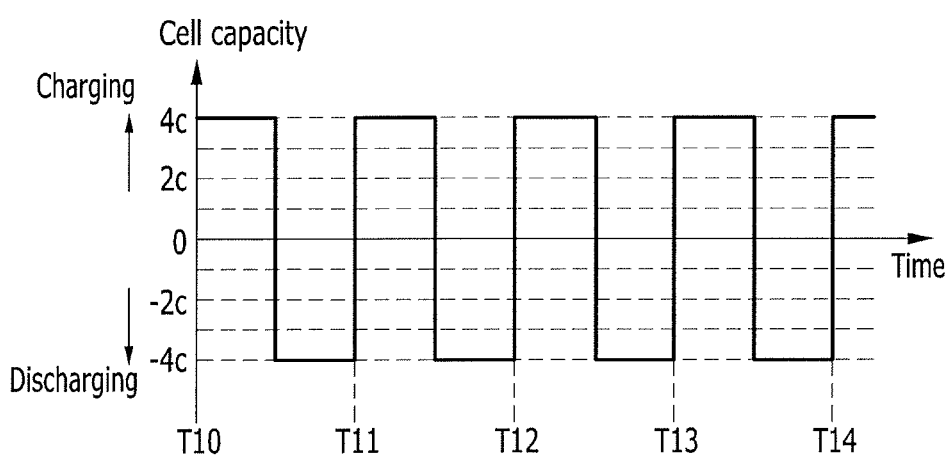
FIGS. 3A to 3C illustrate example waveforms of a first charging and discharging pattern.
Figure 3B:
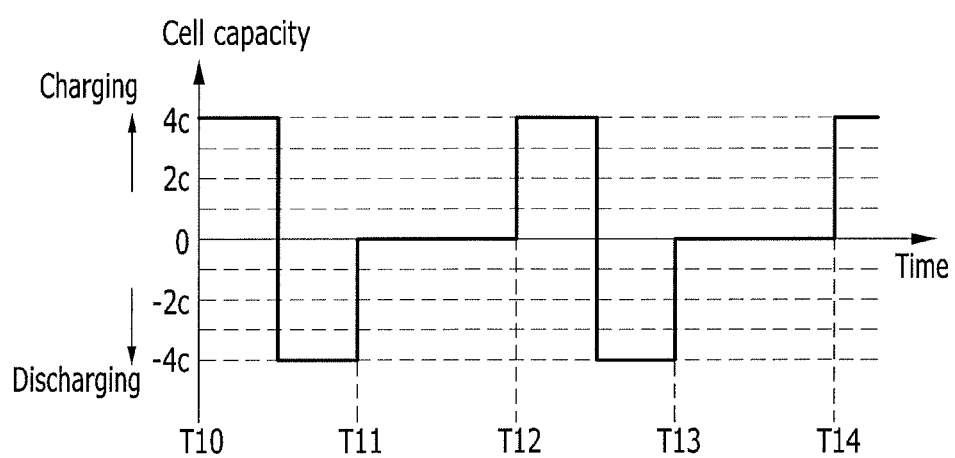
Figure 3C:
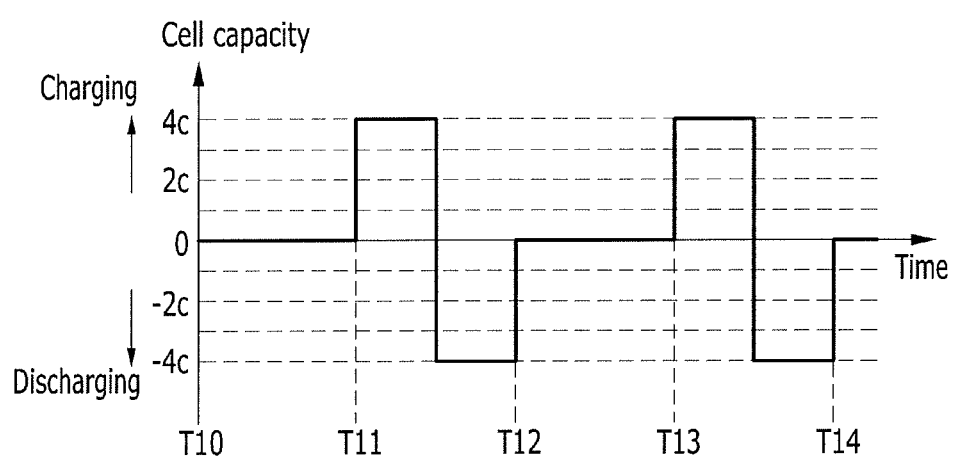

FIGS. 3A to 3C illustrate example waveforms in which square waves are selected as the charging and discharging pattern. FIG. 3A illustrates an exemplary embodiment in which the general control unit 29 has selected the square waves as the charging and discharging pattern based on the first power detection signal SM1, and charging and discharging capacities applied to the charging and discharging pattern include a charging capacity of 4 C and a discharging capacity of 4 C.

Also, FIG. 3A illustrates an example in which 1 cycle period T10-T11 of charging and discharging has been calculated as 5 min and each of a charging period and discharging period for the 1 cycle period has been calculated as 2.5 min. The 1 cycle period denotes a period corresponding to 1 cycle from the start of charging to the end of discharging if charging and discharging are alternately performed.

Thereafter, the general control unit 29 segments the charging and discharging pattern and generates a first cell control pattern for controlling the first cell bank 23 and a second cell control pattern for controlling the second cell bank 25. In this case, the general control unit 29 generates the first and second cell control patterns so that a rest time when charging and discharging are stopped is set in each of the first cell bank 23 and the second cell bank 25.

Furthermore, the general control unit 29 generates a power conversion unit control pattern for controlling the power assist DC/DC converter 24 based on the charging and discharging pattern.

Thereafter, the general control unit 29 outputs the general control signal SC1 to which information about the first and second cell control patterns and information about the power conversion unit control pattern have been added to the interface unit 26.

The interface unit 26 outputs the first cell control signal SC2, that is, a charging and discharging command generated based on the general control signal SC1 received from the general control unit 29, to the first cell bank 23. The interface unit 26 outputs a second cell control signal SC3, that is, a charging and discharging command generated likewise, to the second cell bank 25. The interface unit 26 outputs a converter control signal SC4, that is, an on/off control command for the power assist DC/DC converter 24 generated based on the general control signal SC1 received from the general control unit 29, to the power assist DC/DC converter 24.

Accordingly, the general control unit 29 may generally control the first cell bank 23, the power assist DC/DC converter 24, and the second cell bank 25 through the interface unit 26.

Such general control is advantageous in that a board on which the general control unit 29 has been mounted may be optimized, control delay may be prevented, and influence of noise may be reduced.

Furthermore, convenience may be improved because the interface unit 26 is installed in the power assist unit 20 and control is performed through the interface unit 26. For example, if the power assist system in accordance with the present invention is installed in an existing wind power generation system, the existing wind power generation system may be easily used as the general control unit in accordance with the present invention without substituting the general control unit with a control unit included in the existing wind power generation system (e.g., a control unit for monitoring power).

In the following description, the general control unit 29 has been illustrated as controlling the first cell bank 23, the power assist DC/DC converter 24, and the second cell bank 25 through the interface unit 26, but the general control unit 29 may directly control the first cell bank 23, the power assist DC/DC converter 24, and the second cell bank 25.

For example, in FIG. 3B, first, the general control unit 29 outputs a charging and discharging command based on the charging and discharging pattern of FIG. 3A to the first cell bank 23 as the first cell control pattern (the first cell control signal SC2) in 1 cycle period from T10 to T11 and 1 cycle period from T12 to T13.

Accordingly, the first cell bank 23 is charged and discharged in SOC 100% (in a section of SOC of 0% or more to 100% or less).

The general control unit 29 outputs a charging and discharging stop command to the first cell bank 23 in the 1 cycle period from T11 to T12 and the 1 cycle period from T13 to T14, stops the charging and discharging of the first cell bank 23, and provides a rest time to the first cell bank 23. In periods subsequent to the period T14, the general control unit 29 repeatedly performs control from T10 to T14.

As illustrated in FIG. 3C, the general control unit 29 outputs a charging and discharging stop command to the second cell bank 25 as the second cell control pattern (the second cell control signal SC3) in 1 cycle period from T10 to T11 and 1 cycle period from T12 to T13 in order to stop the charging and discharging of the second cell bank 25, simultaneously turns off the power assist DC/DC converter 24 based on the converter control signal SC4, and provides a rest time to the second cell bank 25 and the power assist DC/DC converter 24.

The general control unit 29 outputs a charging and discharging command based on the charging and discharging pattern of FIG. 3A to the second cell bank 25 in the 1 cycle period from T11 to T12 and the 1 cycle period from T13 to T14, and controls the power assist DC/DC converter 24 so that it is turned on.

Accordingly, the second cell bank 25 is charged and discharged in SOC of 100% (in a section of SOC of 0% or more to 100% or less).

In periods subsequent to the period T14, the general control unit 29 repeatedly performs control from T10 to T14.

Through the aforementioned control method, the charging and discharging power of the first cell bank 23 and the charging and discharging power of the second cell bank 25 are merged in the branch power line L22, and thus charging and discharging power, such as that illustrated in FIG. 3A, is transmitted to the branch power line L22.

For example, charging and discharging power, such as that illustrated in FIG. 3A, is transmitted from the power assist unit 20 to the main line L12, and thus a power assist operation based on a result of a comparison between the first power detection signal SM1 and the profile waveform is performed. Accordingly, a change of the output power of a natural energy power generation system may be absorbed.

In such a power assist operation, each of the first cell bank 23 and the second cell bank 25 has a rest time in each cycle period. As described above, since the rest time is provided to each of the first cell bank 23 and the second cell bank 25, a long life cycle of a cell bank may be achieved compared to a case where the aforementioned control is not performed although charging and discharging of a high rate, such as that illustrated in FIGS. 3A to 3C, has been performed.

Furthermore, there is an advantage in that a capability ratio of the power assist DC/DC converter 24 may be reduced because the power assist DC/DC converter 24 is controlled so that it is turned off in the period in which the second cell bank 25 is stopped. Accordingly, the entire efficiency of the power assist unit 20 may be improved. For example, the entire efficiency of the power assist unit 20 may be improved by 10% or more.

In FIGS. 3B and 3C, each of the first cell bank 23 and the second cell bank 25 has a rest time in each cycle period. In another embodiment, the rest time may be placed in a specific cycle of 2 cycles or more. Furthermore, the first cell bank 23 and the second cell bank 25 may have different rest times.

Furthermore, in FIGS. 3B and 3C, the first cell bank 23 and the second cell bank 25 have been illustrated as being charged and discharged in SOC of 100% (in a section of SOC 0% or more to 100% or less). In another embodiment, for example, the first cell bank 23 and the second cell bank 25 may be charged and discharged at R1 % of SOC of less than 100% (in a section of SOC 0% or more to R 1 % or less). Accordingly, control performed by the general control unit 29 may be simplified.

Furthermore, in FIGS. 3A to 3C, the power assist DC/DC converter 24 has been illustrated as being turned off in the period in which the second cell bank 25 is stopped. In another embodiment, the power assist DC/DC converter 24 may be turned on in the period in which the second cell bank 25 is stopped and the period in which the charging and discharging of the first cell bank 23 and/or the second cell bank 25 are executed.

Second Charging and Discharging Pattern

Figure 4A:
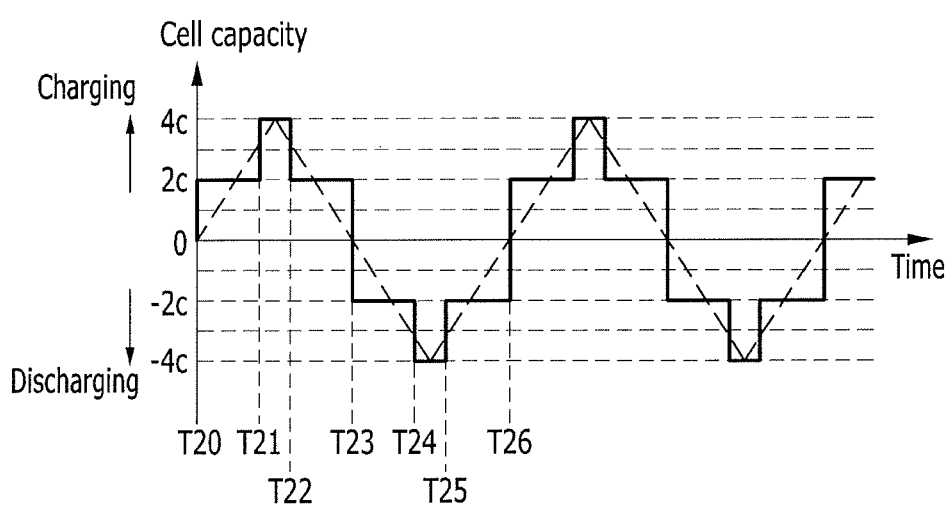
FIGS. 4A to 4C illustrate example waveforms of a second charging and discharging pattern.
Figure 4B:
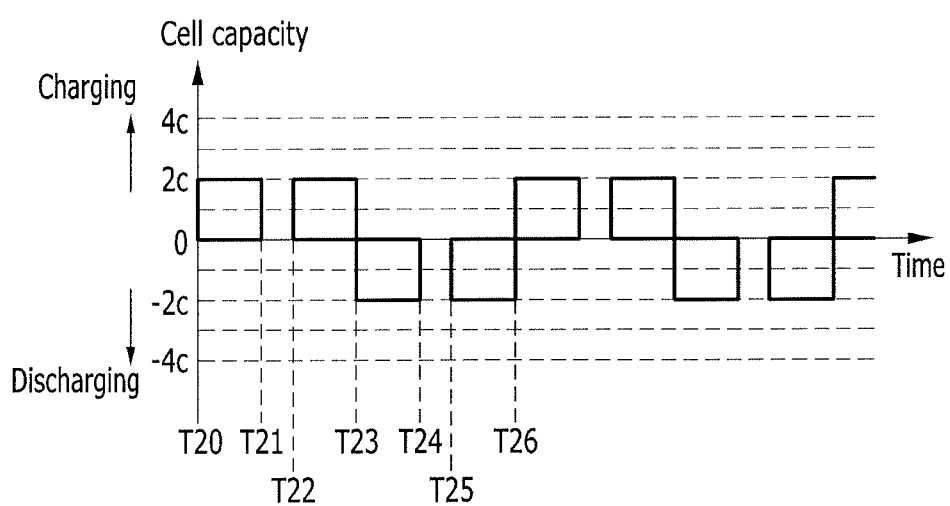
Figure 4C:
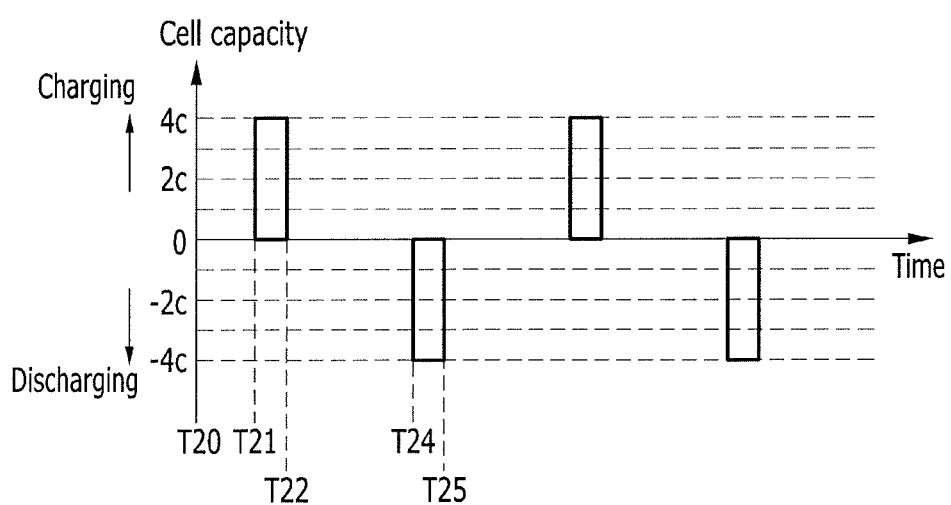

FIGS. 4A to 4C illustrate example waveforms (hereinafter called a triangle wave approximation) that are close to a triangle wave generated by combining square waves and which has been adopted as the charging and discharging pattern.

The example of FIG. 4A illustrates that the general control unit 29 has selected a triangle wave approximation as a charging and discharging pattern based on the first power detection signal SM1, has calculated a maximum value of a charging capacity as 4 C and a maximum value of a discharging capacity as 4 C, and simultaneously has calculated a 1 cycle period T20-T26 of charging and discharging as 10 min and each of a charging period T20-T23 and a discharging period T23-T26 for a 1 cycle period as 5 min based on a triangle wave that is a basis for the triangle wave approximation (refer to a triangular line of FIG. 4A).

As illustrated in a solid line of FIG. 4A, the general control unit 29 generates the triangle wave approximation, that is, a combination of square waves based on the calculated charging and discharging pattern (e.g., the triangle wave).

Next, the general control unit 29 segments the triangle wave approximation and generates a first cell control pattern for controlling the first cell bank 23 and a second cell control pattern for controlling the second cell bank 25. In this case, the general control unit 29 generates the first and second cell control patterns so that a rest time when charging and discharging are stopped is set in each of the first cell bank 23 and the second cell bank 25.

Thereafter, the general control unit 29 outputs the first cell control signal SC2 (e.g., the first cell control pattern) of FIG. 4B to the first cell bank 23 through the interface unit 26 and outputs the second cell control signal SC3 (e.g., the second cell control pattern) of FIG. 4C to the second cell bank 25 through the interface unit 26.

Furthermore, the general control unit 29 generates the power conversion unit control pattern for controlling the power assist DC/DC converter 24 based on the charging and discharging pattern and outputs the converter control signal SC4 (e.g., the power conversion unit control pattern) to the power assist DC/DC converter 24.

For example, the general control unit 29 outputs the converter control signal SC4 for controlling the power assist DC/DC converter 24 so that it is turned on in the period in which the charging and discharging pattern of FIG. 4A has been output, e.g., in the period in which the charging and discharging of the first cell bank 23 and/or the second cell bank 25 has been performed.

In a period from T20 to T21 (e.g., 2 min), the general control unit 29 charges the first cell bank 23 in SOC of 50% (e.g., in a section of SOC of 0% or more to 50% or less) based on the first cell control signal SC2 (refer to FIG. 4B).

Furthermore, the general control unit 29 stops the charging and discharging of the second cell bank 25 based on the second cell control signal SC3 and sets a rest time in the second cell bank 25 (refer to FIG. 4C).

In a period from T21 to T22 (e.g., 1 min), the general control unit 29 sets a rest time in the first cell bank 23 based on the first cell control signal SC2 (refer to FIG. 4B). Furthermore, the general control unit 29 charges the second cell bank 25 in SOC of 100% (e.g., in a section of SOC of 0% or more to 100% or less) based on the second cell control signal SC3 (refer to FIG. 4C).

In a period from T22 to T24 (e.g., 4 min), the general control unit 29 charges and discharges the first cell bank 23 in SOC of 50% (e.g., in a section of SOC of 0% or more to 50% or less) based on the first cell control signal SC2 (refer to FIG. 4B).

Furthermore, the general control unit 29 stops the charging and discharging of the second cell bank 25 based on the second cell control signal SC3 and sets a rest time in the second cell bank 25 (refer to FIG. 4C).

In the period from T24 to T25 (e.g., 1 min), the general control unit 29 sets a rest time in the first cell bank 23 based on the first cell control signal SC2 (refer to FIG. 4B).

Furthermore, the general control unit 29 discharges the second cell bank 25 in SOC of 100% (in a section of SOC of 0% or more to 100% or less) based on the second cell control signal SC3 (refer to FIG. 4C).

In a period from T25 to T26 (e.g., 2 min), the general control unit 29 discharges the first cell bank 23 in SOC of 50% (e.g., in a section of SOC of 0% or more to 50% or less) based on the first cell control signal SC2 (refer to FIG. 4B).

Furthermore, the general control unit 29 stops the charging and discharging of the second cell bank 25 based on the second cell control signal SC3 and sets a rest time in the second cell bank 25 (refer to FIG. 4C).

In periods subsequent to the period T26, the general control unit 29 repeatedly performs control from T20 to T26.

Through the aforementioned control method, the charging and discharging power of the first cell bank 23 and the charging and discharging power of the second cell bank 25 are combined, and thus charging and discharging power (such as illustrated in FIG. 4A) is transmitted to the branch power line L22. For example, charging and discharging power (such as illustrated in FIG. 4A) is transmitted from the power assist unit 20 to the main line L12. Thus, a power assist operation is performed based on a result of a comparison between the first power detection signal SM1 and the profile waveform. Accordingly, a change of the output power of a natural energy power generation system may be absorbed.

In such a power assist operation, the general control unit 29 performs charging and discharging control so that so that a rest time is set in each of the first cell bank 23 and the second cell bank 25. Accordingly, although charging and discharging of a high rate, such as those illustrated in FIGS. 4A to 4C, have been performed, a long life cycle of the first cell bank 23 and the second cell bank 25 may be achieved compared to a case where such control has not been performed.

Furthermore, the general control unit 29 sets the rest time in the first cell bank 23 and simultaneously charges and discharges the first cell bank 23 in SOC of 50% or less (a section of SOC of 0% or more to 50% or less), although it performs charging and discharging on the first cell bank 23.

By performing such charging and discharging control, a long life cycle of a cell bank may be achieved compared to a case where charging and discharging are performed in a section of SOC or 50% or more, e.g., in SOC of 100% (a section of SOC of 0% or more to 100% or less) or SOC of 50% (a section of SOC of 50% or more to 100% or less).

The general control unit 29 charges and discharges the second cell bank 25 in SOC of 100% (a section of SOC of 0% or more to 100% or less), but sets a longer rest time in the second cell bank 25 than in the first cell bank 23. For example, in the present exemplary embodiment, the general control unit 29 controls the rest time set in the second cell bank 25 so that it is quadrupled.

By controlling such control, a long life cycle of the entire power assist unit 20 including the first cell bank 23 and the second cell bank 25 may be achieved while charging and discharging are performed in SOC of 100% (a section of 0% or more to 100% or less).

The general control unit 29 has been illustrated as supplying the first cell bank 23 with the charging and discharging command (hereinafter called a first charging and discharging command) of FIG. 4B and supplying the second cell bank 25 with the charging and discharging command (hereinafter called a second charging and discharging command) of FIG. 4C. However, although the second charging and discharging command is provided to the first cell bank 23 and the first charging and discharging command is provided to the second cell bank 25, there is an advantage in that a long life cycle of all of the first cell bank 23, the second cell bank 25, and the power assist unit 20 may be realized.

Furthermore, in the description of the present exemplary embodiment, the general control unit 29 has been illustrated as charging and discharging the first cell bank 23 in SCO of 50% (a section of SOC of 0% or more to 50% or less) when performing a charging and discharging operation on the first cell bank 23 and as charging and discharging the second cell bank 25 in SOC of 100% (in a section of SOC of 0% or more to 100% or less) when performing a charging and discharging operation on the second cell bank 25.

In another embodiment, a long life cycle of the entire power assist unit 20 including the first cell bank 23 and the second cell bank 25 may be realized although the first cell bank 23 is charged and discharged in SOC of Q1% (Q1=50 and simultaneously in a section of SOC 0% or more to Q1% or less) when the first cell bank 23 is charged and discharged, and the second cell bank 25 is charged and discharged in SOC of Q2% (Q1<Q 2=100 and simultaneously in a section of SOC of 0% or more to Q2% or less) when the second cell bank 25 is charged and discharged.

Furthermore, the general control unit 29 has been illustrated as controlling the power assist DC/DC converter 24 so that it is turned on in the period in which the charging and discharging pattern of FIG. 4 has been output. In another embodiment, the general control unit 29 may control the power assist DC/DC converter 24 so that it is turned off in the period in which the charging and discharging of the second cell bank 25 has been stopped.

By performing such control, the entire efficiency of the power assist unit 20 may be improved because a capability ratio of the power assist DC/DC converter 24 may be reduced. Furthermore, the general control unit 29 controls a rest time so that it is quadrupled in the second cell bank 25 with respect to a charging and discharging period, but the rest time may have only to be set longer than that of the first cell bank 23. The rest time may be shorter than four times or may be four times or more. Even in this case, a long life cycle effect of the power assist unit 20 is achieved.

Third Charging and Discharging Pattern

Figure 5A:
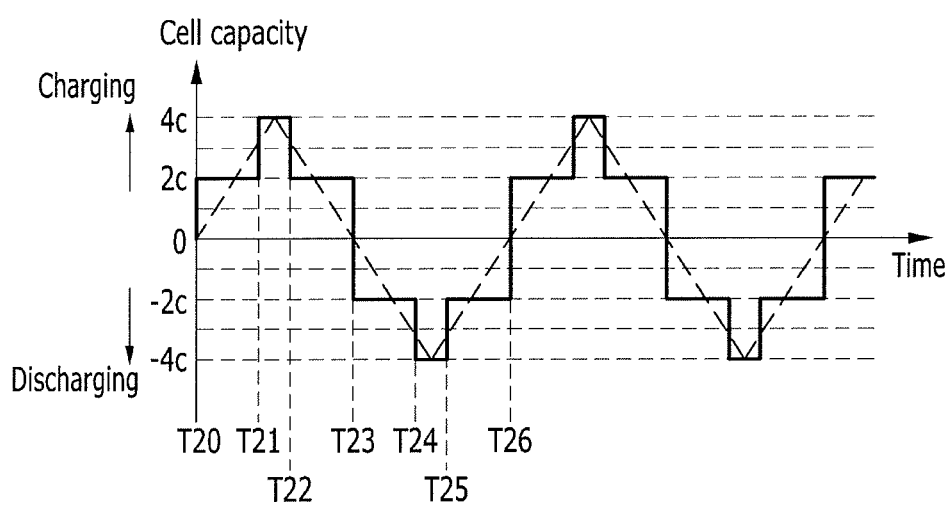
FIGS. 5A to 5C illustrate example waveforms of a third charging and discharging pattern.
Figure 5B:
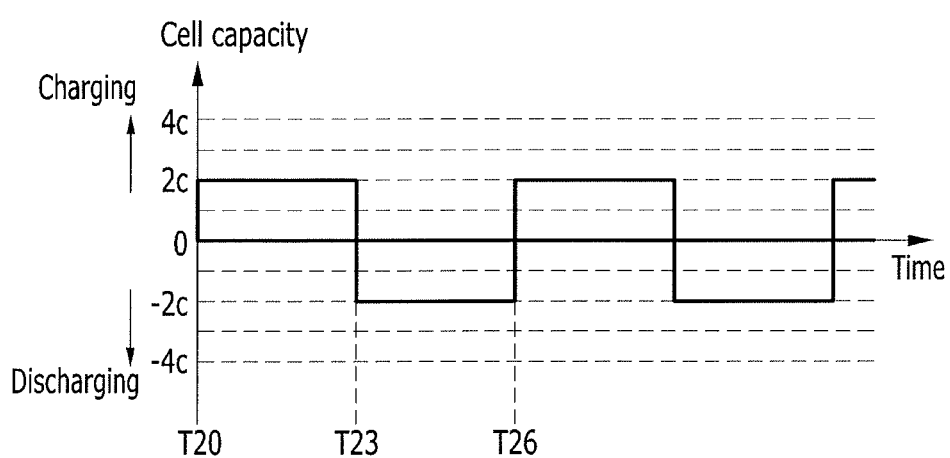
Figure 5C:
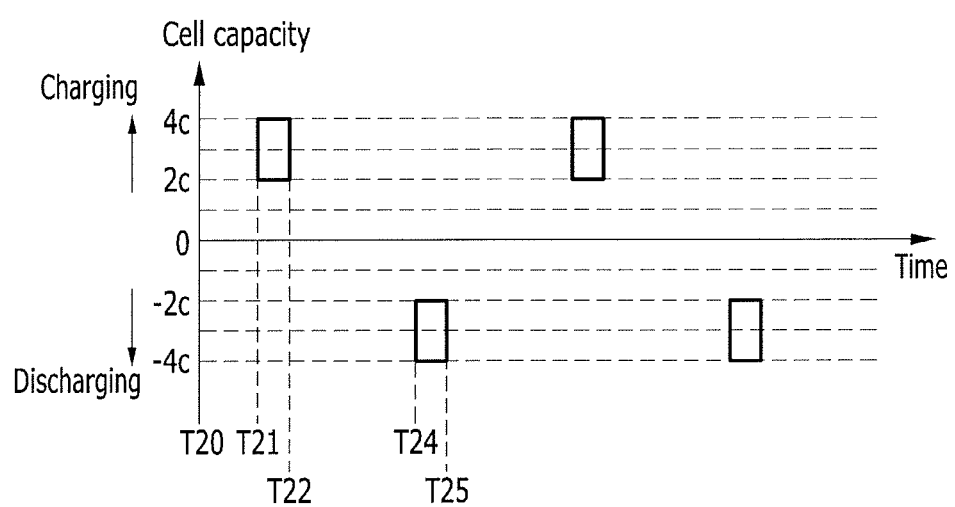

FIGS. 5A to 5C illustrate example waveforms generated by the general control unit 29 that have charging and discharging pattern when a triangle wave approximation is selected as a charging and discharging pattern. FIG. 5A illustrates that the general control unit 29 selects a triangle wave approximation based on the first power detection signal SM1 and calculates a triangle wave, such as a triangular line of FIG. 4A, as a charging and discharging pattern (the triangle wave) that is a basis for the triangle wave approximation.

In FIG. 4A, the general control unit 29 generates the triangle wave approximation, that is, a combination of square waves, based on the calculated charging and discharging pattern (the triangle wave).

Next, the general control unit 29 segments the triangle wave approximation and generates a first cell control pattern for controlling the first cell bank 23 and a second cell control pattern for controlling the second cell bank 25.

Thereafter, the general control unit 29 outputs the first cell control signal SC2 illustrated in FIG. 5B to the first cell bank 23 through the interface unit 26 and outputs the second cell control signal SC3 illustrated in FIG. 5C to the second cell bank 25 through the interface unit 26.

Furthermore, the general control unit 29 generates a power conversion unit control pattern for controlling the power assist DC/DC converter 24 based on such a charging and discharging pattern, and outputs the converter control signal SC4 (e.g., the power conversion unit control pattern) to the power assist DC/DC converter 24. For example, the general control unit 29 may output the converter control signal SC4 that controls the power assist DC/DC converter 24 so that it is turned on in the period in which the charging and discharging pattern of FIG. 5A has been output.

In FIG. 5B, in a period from T20 to T26 (e.g., 10 min) the general control unit 29 charges and discharges the first cell bank 23 in SCO of 50% (a section of SOC of 0% or more to 50% or less) based on the first cell control signal SC2.

In FIG. 5C, in the period from T20 to T21 (e.g., 2 min), the general control unit 29 stops the charging and discharging of the second cell bank 25 based on the second cell control signal SC3 and sets a rest time in the second cell bank 25.

In the period from T21 to T22 (e.g., 1 min), the general control unit 29 charges the second cell bank 25 in SOC of 50% (a section of SOC of 50% or more to 100% or less) based on the second cell control signal SC3.

In the period from T22 to T24 (e.g., 4 min), the general control unit 29 stops the charging and discharging of the second cell bank 25 based on the second cell control signal SC3 and sets a rest time in the second cell bank 25.

In the period from T24 to T25 (e.g., 1 min), the general control unit 29 discharges the second cell bank 25 in SOC of 50% (a section of SOC of 50% or more to 100% or less) based on the second cell control signal SC3.

In the period from T25 to T26 (e.g., 2 min), the general control unit 29 stops the charging and discharging of the second cell bank 25 based on the second cell control signal SC3 and sets a rest time in the second cell bank 25.

In periods subsequent to the period T26, the general control unit 29 repeatedly performs control, such as that from T20 to T26, on the first cell bank 23 and the second cell bank 25.

By performing such control, the charging and discharging power of the first cell bank 23 and the charging and discharging power of the second cell bank 25 are combined, and thus charging and discharging power (such as that of FIG. 5A) is transmitted to the branch power line L22. In other words, charging and discharging power, such as that of FIG. 5A, is transmitted from the power assist unit 20 to the main line L12. Thus, a power assist operation based on a result of a comparison between the first power detection signal SM1 and the profile waveform is performed. Accordingly, a change of the output power of a natural energy power generation system may be absorbed.

In such a power assist operation, the general control unit 29 performs charging and discharging control on the second cell bank 25 so that a rest time is set in the second cell bank 25. Accordingly, although charging and discharging of a high rate, such as those illustrated in FIG. 5C, have been performed, a long life cycle of the second cell bank 25 may be achieved compared to a case where such control has not been performed.

In the present embodiment, the general control unit 29 does not perform control for providing a rest time in the first cell bank 23 on the first cell bank 23. However, the general control unit 29 charges and discharges the first cell bank 23 in SCO of 50% (a section of SOC of 0% or more to 50% or less) over the entire period of the power assist operation (e.g., a charging and discharging operation).

By performing such charging and discharging control, a long life cycle of a cell bank may be realized compared to a case where charging and discharging are performed in a section including SOC or 50% or more, for example, in SOC of 100% (a section of 0% or more to 100% or less) or SOC of 50% (a section of SOC of 50% or more to 100% or less).

The second cell bank 25 performs charging and discharging in the section including SOC 50% or more (e.g., SOC of 50% (in the section of SOC of 50% or more to 100% or less)). In this case, the SOC is set to 50% and a longer rest time is provided in the second cell bank 25. For example, in the present exemplary embodiment, a rest time is controlled so that it quadrupled in a charging and discharging period.

By performing such control, a long life cycle of the entire power assist unit 20 including the first cell bank 23 and the second cell bank 25 may be realized while the same charging and discharging is performed in SOC of 100% (a section of 0% or more to 100% or less) in the entire system.

The general control unit 29 has been illustrated as supplying the first cell bank 23 with the charging and discharging command (hereinafter called a third charging and discharging command) illustrated in FIG. 5B and supplying the second cell bank 25 with the charging and discharging command (hereinafter called a fourth charging and discharging command) illustrated in FIG. 5C. However, the life cycle of each cell bank and a long life cycle of the entire power assist unit 20 may be realized although the general control unit 29 is configured to supply the first cell bank 23 with the fourth charging and discharging command and supply the second cell bank 25 with the third charging and discharging command.

Furthermore, in the description of the charging and discharging control in accordance with the present exemplary embodiment, the general control unit 29 has been illustrated as charging and discharging the first cell bank 23 in SOC of 50% (e.g., in a section of SOC of 0% or more to 50% or less)

when performing a charging and discharging operation on the first cell bank 23 and as charging and discharging the second cell bank 25 in SOC of 50% (a section of SOC of 50% or more to 100% or less) when performing charging and discharging on the second cell bank 25.

In another embodiment, a long life cycle of the entire power assist unit 20 including the first cell bank 23 and the second cell bank 25 may be realized although the first cell bank 23 is charged and discharged in SOC of Q1% (Q1=50 and simultaneously in a section of SOC 0% or more to Q1% or less) when the first cell bank 23 is charged and discharged and the second cell bank 25 is charged and discharged in SOC of Q2% (Q1+Q2=1100 and simultaneously in a section of SOC of Q1% or more to Q2% or less) when the second cell bank 25 is charged and discharged.

Furthermore, the general control unit 29 is illustrated as controlling the power assist DC/DC converter 24 so that it is turned on in the period in which the charging and discharging pattern of FIG. 5A has been output. In another embodiment, the general control unit 29 may control the power assist DC/DC converter 24 so that it is turned off in the period in which the second cell bank 25 has been stopped. Thus, the entire efficiency of the power assist unit 20 may be improved because a capability ratio of the power assist DC/DC converter 24 may be reduced.

Fourth Charging and Discharging Pattern

Figure 6A:
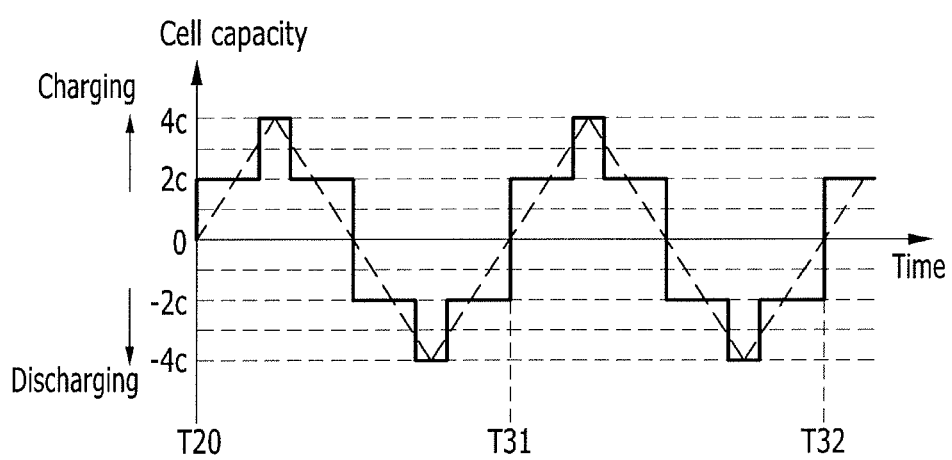
FIGS. 6A to 6C illustrate example waveforms of a fourth charging and discharging pattern.
Figure 6B:
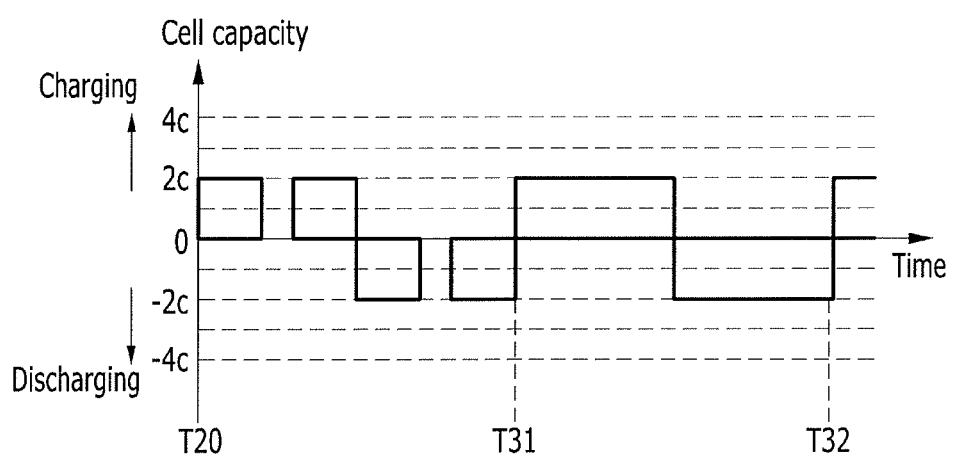
Figure 6C:
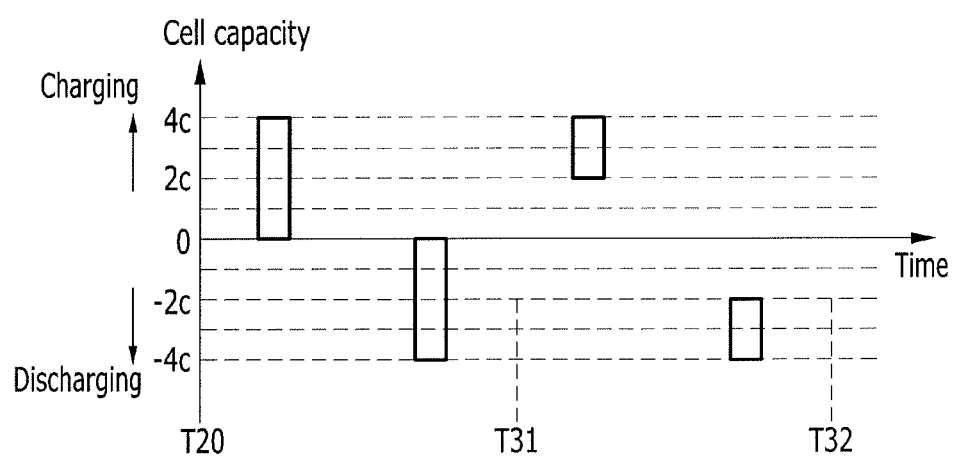

FIGS. 6A to 6C illustrate additional example waveforms. In these example, if triangle wave approximation has been selected as a charging and discharging pattern, the general control unit 29 performs an operation by combining the first and second charging and discharging commands illustrated in FIGS. 4B and 4C and the third and fourth charging and discharging commands illustrated in FIGS. 5B and 5C.

In the example of FIG. 6A, as in the example of FIG. 4A, the general control unit 29 calculates a triangle wave indicated by a triangular line and generates a triangle wave approximation indicated by a solid line, that is, a combination of square waves.

Thereafter, the general control unit 29 segments the triangle wave approximation, generates cell control patterns for controlling the first cell bank 23 and the second cell bank 25, outputs the first cell control signal SC2 of FIG. 6B to the first cell bank 23 through the interface unit 26, and outputs the second cell control signal SC3 of FIG. 6C to the second cell bank 25 through the interface unit 26.

Furthermore, the general control unit 29 outputs the converter control signal SC4 that controls the power assist DC/DC converter 24 so that it is turned on in the period in which the charging and discharging pattern of FIG. 6A has been output.

In FIGS. 6B and 6C, in a period from T30 to T31 (e.g., 10 min), the general control unit 29 applies a first charging and discharging command (e.g., the same command as that in the period from T20 to T26) of FIG. 4B to the first cell bank 23 based on the first cell control signal SC2. Furthermore, the general control unit 29 applies a second charging and discharging command (e.g., the same command as that in the period from T20 to T26) of FIG. 4C to the second cell bank 25 based on the second cell control signal SC3.

In a period from T31 to 132 (e.g., 10 min), the general control unit 29 applies a third charging and discharging command (e.g., the same command as that in the period from T20 to T26) of FIG. 5B to first cell bank 23 based on first cell control signal SC2.

Furthermore, the general control unit 29 applies a fourth charging and discharging command (e.g., the same command as that in the period from T20 to T26) of FIG. 5C to the second cell bank 25 based on the second cell control signal SC3.

In periods subsequent to the period T32, the general control unit 29 repeatedly performs control from T30 to T32.

By performing such control, the charging and discharging power of the first cell bank 23 and the charging and discharging power of the second cell bank 25 are combined, and thus charging and discharging power (such as illustrated in FIG. 6A) is transmitted to the branch power line L22. For example, charging and discharging power (such as illustrated in FIG. 6A) is transmitted from the power assist unit 20 to the main line L12. Thus, a power assist operation based on a result of a comparison between the first power detection signal SM1 and the profile waveform is performed. Accordingly, a change of the output power of a natural energy power generation system may be absorbed.

Furthermore, since the charging and discharging of the first cell bank 23 and the second cell bank 25 are performed based on the charging and discharging pattern in which the second charging and discharging pattern and the third charging and discharging pattern are combined, a long life cycle of the entire power assist unit 20 including the first cell bank 23 and the second cell bank 25 may be realized as in the case where the second charging and discharging pattern or the third charging and discharging pattern has been applied.

The general control unit 29 has been illustrated as alternately applying a fifth charging and discharging command for applying the first charging and discharging command (FIG. 4B) to the first cell bank 23, simultaneously applying the second charging and discharging command (FIG. 4C) to the second cell bank 25 and a sixth charging and discharging command for applying the third charging and discharging command (FIG. 5B) to the first cell bank 23, and simultaneously applying the fourth charging and discharging command (FIG. 5C) to the second cell bank 25 every 1 cycle period.

In another embodiment, the fifth charging and discharging command may be consecutively provided for a plurality of cycle periods, and then the sixth charging and discharging command may be consecutively provided for a plurality of cycle periods. Such control may be alternately repeated.

Furthermore, a seventh charging and discharging command for applying the second charging and discharging command (FIG. 4C) to the first cell bank 23 and simultaneously applying the first charging and discharging command (FIG. 4B) to the second cell bank 25, and an eighth charging and discharging command for applying the fourth charging and discharging command (FIG. 5C) to the first cell bank 23 and simultaneously applying the third charging and discharging command (FIG. 5B) to the second cell bank 25, may be alternately applied every 1 cycle period. For example, the seventh charging and discharging command may be consecutively applied for a plurality of cycle periods, and then the eighth charging and discharging command may be consecutively applied for a plurality of cycle periods. Such control may be alternately repeated.

Furthermore, the fifth to eighth charging and discharging commands may be provided in a specific combination. A combination of square waves is not limited to the second to fourth charging and discharging patterns, and a triangle wave approximation may be realized by a combination of different square waves in another embodiment. In this case, the general control unit 29 generates a triangle wave approximation so that a rest time is set in at least one of the first cell bank 23 and the second cell bank 25.

Fifth Charging and Discharging Pattern

Figure 7A:
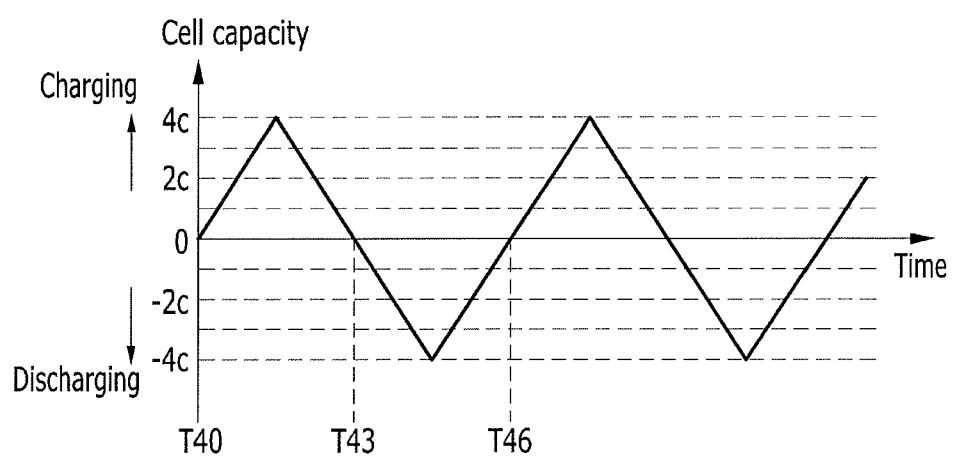
FIGS. 7A to 7C illustrate example waveforms of a fifth charging and discharging pattern.
Figure 7B:
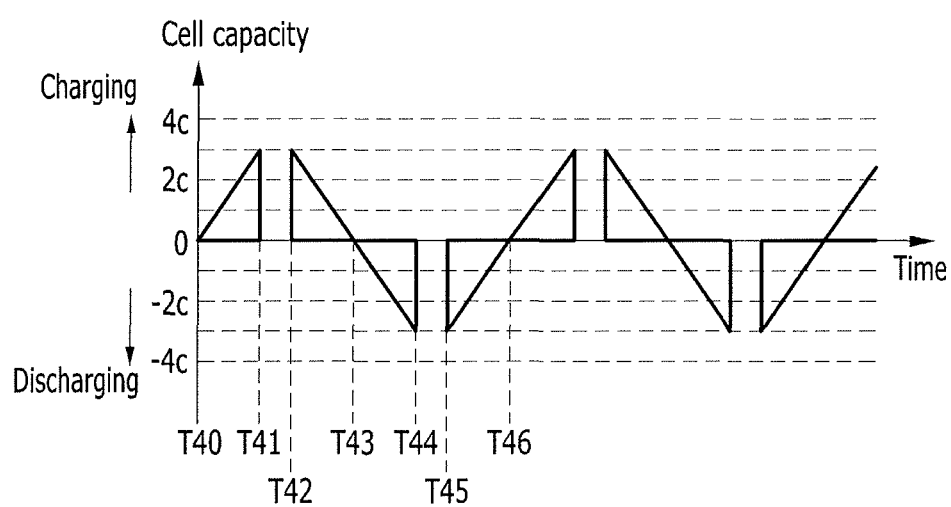
Figure 7C:
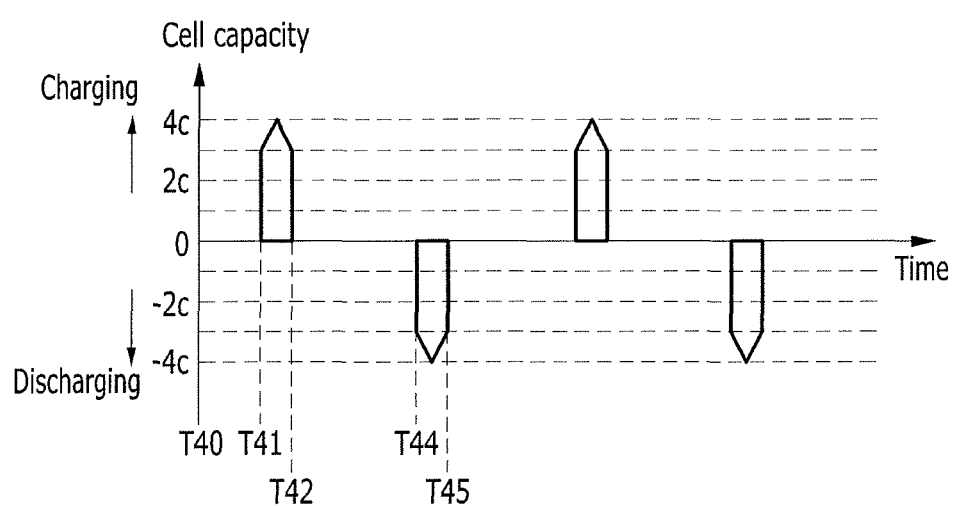

FIGS. 7A to 7C illustrating example waveforms in the case where a triangle wave has been selected as a charging and discharging pattern. The example of FIG. 7A illustrates that the general control unit 29 has adopted the triangle wave as the charging and discharging pattern based on the first power detection signal SM1, has calculated a maximum value of a charging capacity as 4 C, a maximum value of a discharging capacity as 4 C, and simultaneously calculated a 1 cycle period T40 to T46 of charging and discharging as 10 min and each of a charging period T40 to T43 and a discharging period 143 to T46 for 1 cycle period as 5 min with respect to the charging and discharging pattern.

Thereafter, the general control unit 29 segments the triangle wave and generates a first cell control pattern for controlling the first cell bank 23 and a second cell control pattern for controlling the second cell bank 25.

Thereafter, the general control unit 29 outputs the first cell control signal SC2 (e.g., the first cell control pattern) illustrated in FIG. 7B to the first cell bank 23 through the interface unit 26 and outputs the second cell control signal SC3 (e.g., the second cell control pattern) in FIG. 7C to the second cell bank 25 through the interface unit 26.

Furthermore, the general control unit 29 outputs the converter control signal SC4 that controls the power assist DC/DC converter 24 so that it is turned on in the period in which the charging and discharging pattern of FIG. 7A has been output.

In FIGS. 7B and 7C, in the period from T40 to T41 (e.g., about 1.9 min), the general control unit 29 charges the first cell bank 23 based on the first cell control signal SC2 in SOC of 75% (a section of SOC 0% or more to 75% or less) and simultaneously so that the SOC is linearly increased from 0% to 75% (refer to FIG. 7B).

Furthermore, the general control unit 29 stops the charging and discharging of the second cell bank 25 based on the second cell control signal SC3 and sets a rest time in the second cell bank 25 (refer to FIG. 7C).

In the period from T41 to T42 (e.g., 1.2 min), the general control unit 29 sets a rest time in first cell bank 23 based on the first cell control signal SC2 (refer to FIG. 7B).

Furthermore, the general control unit 29 charges the second cell bank 25 based on the second cell control signal SC3 in SOC of 100% (in a section of SOC of 0% or more to 100% or less) and simultaneously so that SOC rises from 0% to 75%, linearly increases to 100%, linearly decreases from 100% to 75%, and then drops to 0% (refer to FIG. 7C).

In the period from T42 to T43 (e.g., 1.9 min), the general control unit 29 charges the first cell bank 23 based on the first cell control signal SC2 in SOC of 75% (a section of SOC 0% or more to 75% or less) and simultaneously SOC linearly decreases from 75% to 0% (refer to FIG. 7B).

Furthermore, the general control unit 29 stops the charging and discharging of the second cell bank 25 based on the second cell control signal SC3 and sets a rest time in the second cell bank 25 (refer to FIG. 7C).

In the period from T43 to 144 (e.g., 1.9 min), the general control unit 29 discharges the first cell bank 23 based on the first cell control signal SC2 in SOC of 75% (a section of SOC 0% or more to 75% or less) and simultaneously so that SOC linearly increases from 0% to 75% (refer to FIG. 7B).

Furthermore, the general control unit 29 stops the charging and discharging of the second cell bank 25 based on the second cell control signal SC3 and sets a rest time in the second cell bank 25 (refer to FIG. 7C).

In the period from T44 to T45 (e.g., 1.2 min), the general control unit 29 sets a rest time in first cell bank 23 based on the first cell control signal SC2 (refer to FIG. 7B).

Furthermore, the general control unit 29 discharges the second cell bank 25 based on the second cell control signal SC3 in SOC of 100% (in a section of SOC of 0% or more to 100% or less) and simultaneously so that SOC rises from 0% to 75%, linearly increases to 100%, linearly decreases from 100% to 75%, and then drops to 0% (refer to FIG. 7C).

In the period from T45 to T46 (e.g., 1.9 min), the general control unit 29 discharges the first cell bank 23 based on the first cell control signal SC2 in SOC of 75% (a section of SOC 0% or more to 75% or less) and simultaneously so that SOC linearly decreases from 75% to 0% (refer to FIG. 7B).

Furthermore, the general control unit 29 stops the charging and discharging of the second cell bank 25 based on the second cell control signal SC3 and sets a rest time in the second cell bank 25 (refer to FIG. 7C).

In periods subsequent to the period T46, the general control unit 29 repeatedly performs control from T40 to T46.

By performing such control, the charging and discharging power of the first cell bank 23 and the charging and discharging power of the second cell bank 25 are combined, and thus charging and discharging power (such as that illustrated in FIG. 7A) is transmitted to the branch power line L22. For example, charging and discharging power (such as that illustrated in FIG. 7A) is transmitted from the power assist unit 20 to the main line L12.

Thus, a power assist operation based on a result of a comparison between the first power detection signal SM1 and the profile waveform is performed. Accordingly, a change of the output power of a natural energy power generation system may be absorbed.

In such a power assist operation, the general control unit 29 performs charging and discharging control so that a rest time is set in each of the first cell hank 23 and the second cell bank 25. Accordingly, although charging and discharging of a high rate illustrated in FIGS. 7A to 7C have been performed, a long life cycle of a cell bank may be realized compared to a case where such control has not been performed.

In FIGS. 7B and 7C, each of the periods T40 to T41, 141 to T42, T42 to T44, T44 to T45, and T45 to T46 may be randomly changed, and the charging and discharging time and rest time of each of the first cell bank 23 and of the second cell bank 25 may be controlled. Even in this case, a long life cycle of the first cell bank 23 and the second cell bank 25 and a long life cycle of the entire power assist unit 20 may be realized.

Additional Embodiment

Figure 8:
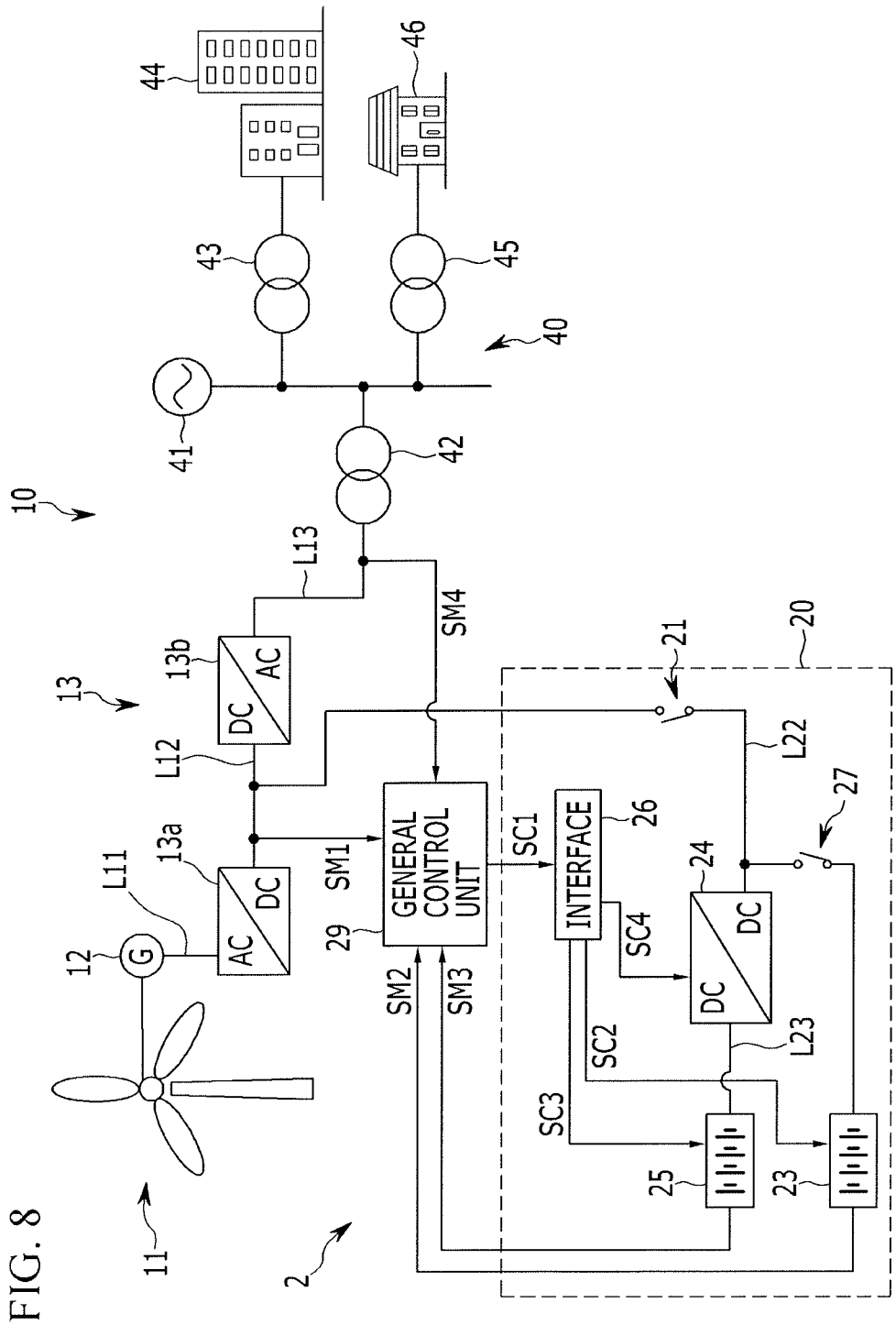
FIG. 8 illustrates another embodiment of wind power generation system and power assist system.

FIG. 8 illustrates another embodiment of a wind power generation system and a power assist system. The power assist unit 20 of FIG. 8 is different from that of FIG. 1 in that a DC circuit breaker 27 is installed in the branch power line L22 that belongs to power lines after a branch and that is placed on the part of the first cell bank 23. Also, the interface unit 26 outputs a breaker control signal SC5 for controlling the cut-off/conduction of the DC circuit breaker 27 based on the general control signal SC1 from the general control unit 29 so that the DC circuit breaker 27 is turned on or off.

For example, the DC circuit breaker 27 changes cut-off/conduction between the branch power line L22 and the first cell bank 23 based on the breaker control signal SC5 from the interface unit 26 and to conduct the branch power line L22 and the first cell bank 23 when the first cell bank 23 performs a charging and discharging operation. If the first cell bank 23 stops its charging and discharging operation, the DC circuit breaker 27 cuts off the connection of the branch power line L22 and the first cell hank 23.

Charging and discharging control on the power assist unit 20 through the general control unit 29 may be performed using the same method as the aforementioned charging and discharging control method.

As described above, the charging and discharging of the first cell bank 23 may be performed based on the first cell control signal SC2. Since the connection of the first cell bank 23 may be physically cut off by installing the DC circuit breaker 27, the propagation of power between the branch power line L22 and the first cell bank 23 may be certainly blocked when the first cell bank 23 does not perform a charging and discharging operation.

Additional Embodiment

Figure 9:
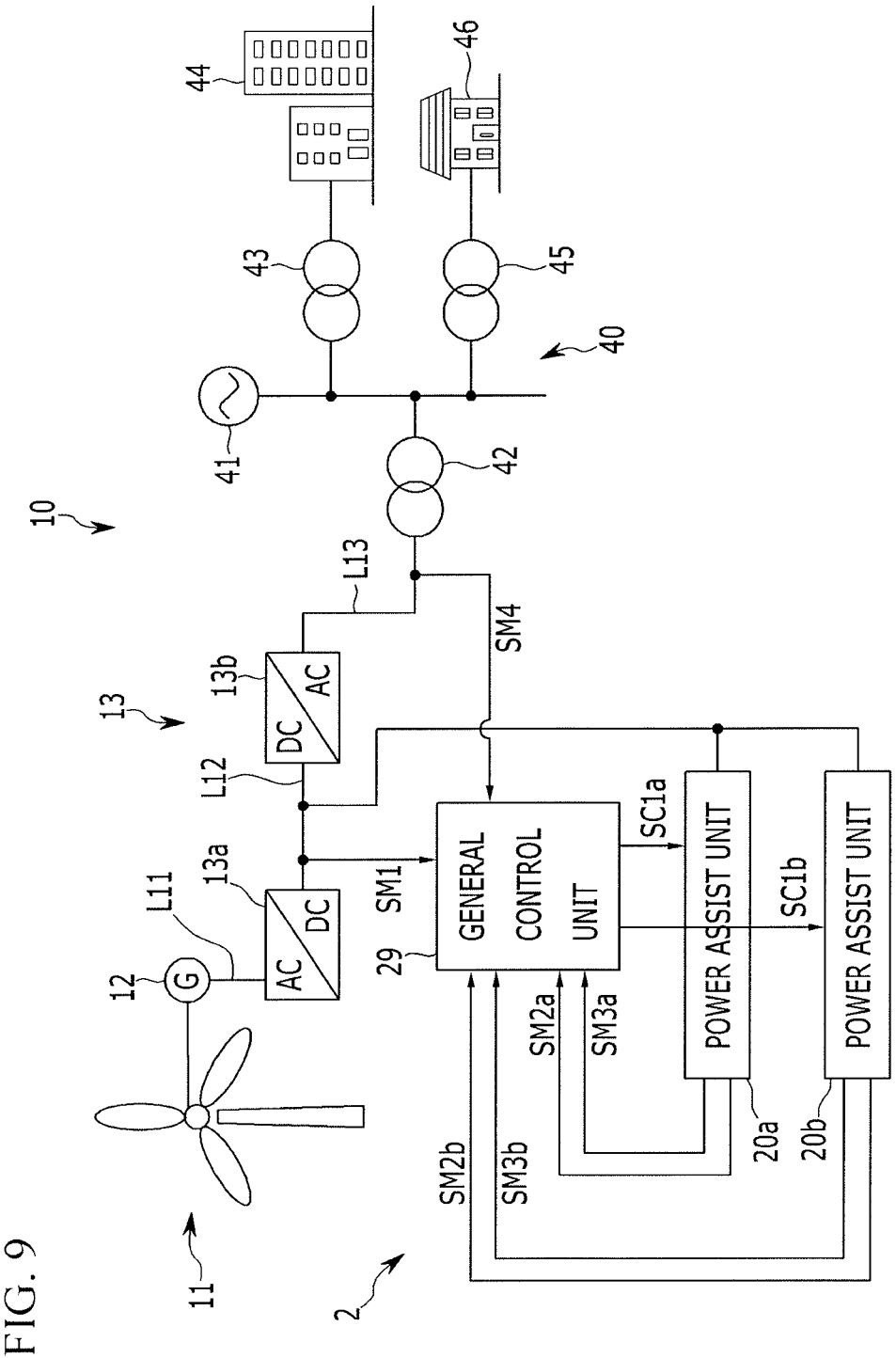
FIG. 9 illustrates another embodiment of wind power generation system and power assist system.

FIG. 9 illustrates another embodiment of a wind power generation system and a power assist system in which two power assist units are connected to the wind power generation system. The power assist system 2 includes power assist units 20a and 20b connected to the main line L12 of the wind power generation system 10 of FIG. 1 and the general control unit 29. For example, the two power assist units 20a and 20b are connected in parallel to the main line L12 of the wind power generation system 10. Each of the power assist units 20a and 20b may have the same configuration as the power assist unit 20 of FIG. 1.

The general control unit 29 receives the first power detection signal SM1 indicative of the power situation of the main line L12 and outputs a general control signal SC1a to the interface unit of the power assist unit 20a. Likewise, the general control unit 29 outputs a general control signal SC1b to the interface unit of the power assist unit 20b. Accordingly, the general control unit 29 may generally control the first cell banks, power assist DC/DC converters, and second cell banks of the two power assist units 20a and 20b.

Furthermore, the general control unit 29 receives a first cell monitoring signal SM2a and a second cell detection signal SM3a from the power assist unit 20a and receives a first cell monitoring signal SM2b and a second cell detection signal SM3b from the power assist unit 20b. Accordingly, the general control unit 29 may generally monitor the cell voltages, charging and discharging currents, and charging and discharging power of the first cell banks 23 and second cell banks 25 of the two power assist units 20a and 20b.

Furthermore, the general control unit 29 may perform control based on each of pieces of information, for example, information about the charging and discharging of the first cell banks 23 or the second cell banks 25 and information about the driving of power storage devices. Accordingly, control performance according to the general control unit 29 may be improved.

FIG. 9 illustrates an example in which the two power assist units 20a and 20b are connected in parallel to the main line L12 of the wind power generation system 10. In another embodiment, three or more power assist units 20 may be connected in parallel to the main line L12 of the wind power generation system 10. Even in this case, through a configuration such as that of FIG. 9, the general control unit 29 may generally control the power assist units 20 and may monitor the cell voltages of the first cell bank 23 and the second cell bank 25 included in each of the power assist units 20 together.

Another Embodiment

Figure 10:
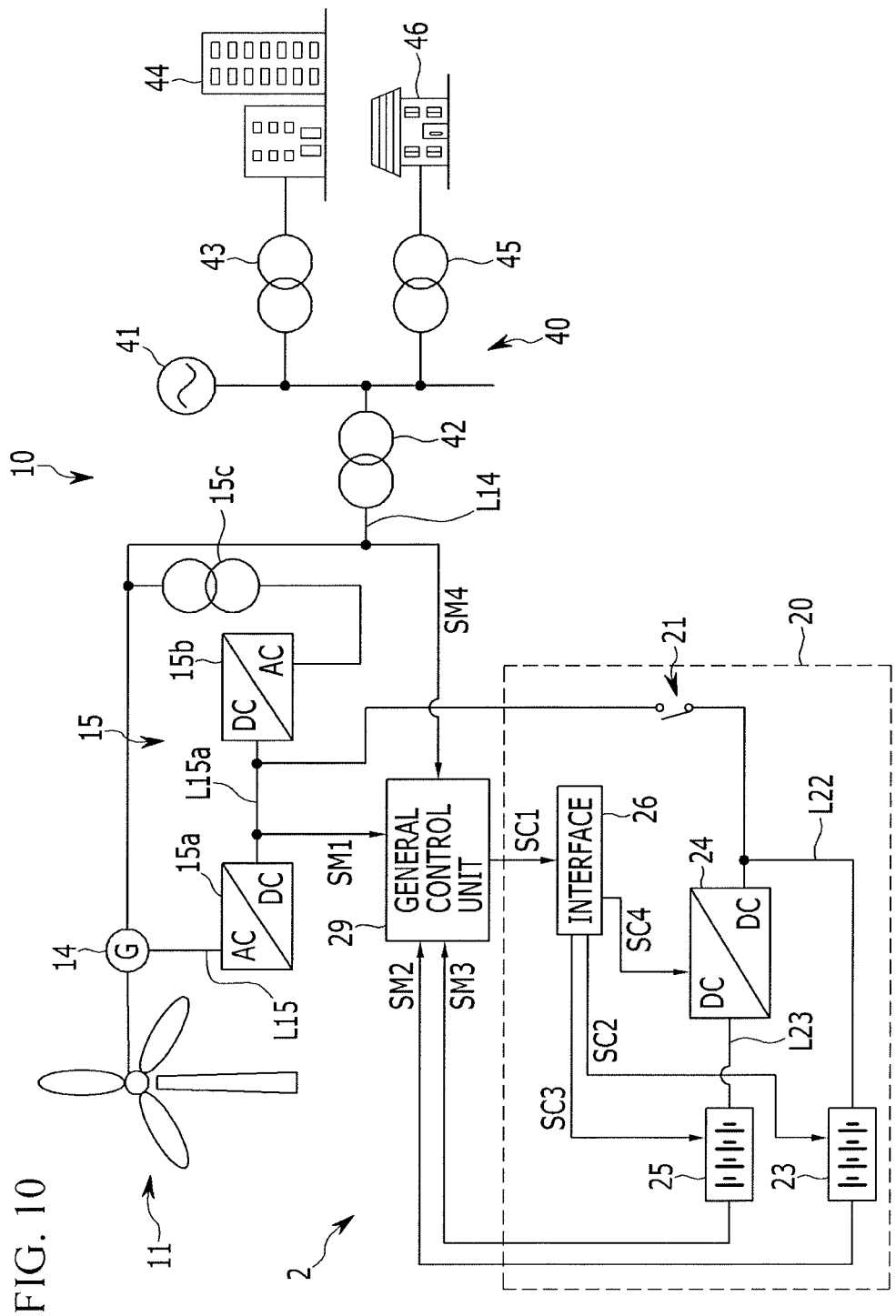
FIG. 10 illustrates another embodiment of wind power generation system and power assist system.

FIG. 10 illustrates another embodiment of a wind power generation system and a power assist system in which the power assist system 2 has been applied to the wind power generation system 10 including an induction power generator 14. The wind power generation system 10 in this embodiment includes the windmill 11 (e.g., a body rotated by the wind), the induction power generator 14 connected to the rotation shaft of the windmill 11 and driven by the rotating body, and a power conversion unit 15 installed in the second winding L15 of the induction power generator 14.

Power generated by the induction power generator 14 is output to a main line L14 and connected to a system 40 through a transformer 42.

The power conversion unit 15 includes a first power generation system inverter 15a configured to convert AC power into DC power (e.g., AC/DC conversion), a second power generation system inverter 15b configured to convert the DC power, output by the first power generation system inverter 15a, into AC power (e.g., DC/AC conversion), and a transformer 15c configured to transform the AC power output by the second power generation system inverter 15b so that the transformed AC power is connected to the main line L14.

The power assist system 2 includes a power assist unit 20 connected to a DC power line L15a that belongs to the second winding L15 of the induction power generator 14 and is placed between the first power generation system inverter 15a and the second power generation system inverter 15b, and a general control unit 29 to control the power assist unit 20. The power assist unit 20 may have the same configuration as one or more previous embodiments.

The general control unit 29 receives a first power detection signal SM1 indicative of the power situation of the DC power line L15a before assist power according to the power assist system 2 (the power assist unit 20) is supplied, and outputs a general control signal SC1 to the interface unit 26 of the power assist unit 20.

Furthermore, the general control unit 29 receives a second power detection signal SM4 indicative of the power situation of the main line L14 through which AC power transformed by the second power generation system inverter 15b and the transformer 15c after the power assist operation of the power assist unit 20 is performed is transmitted, and monitors a power situation after the power assist operation, e.g., monitors whether a desired power assist operation has been performed.

Control performed by the general control unit 29 may be the same as any of the previous embodiments. Through such a configuration, although the induction power generator has been applied to the wind power generation system, a power assist operation may be realized using the power assist system and power generated by the wind power generation system may be stably supplied to the system.

Another Embodiment

Figure 11:
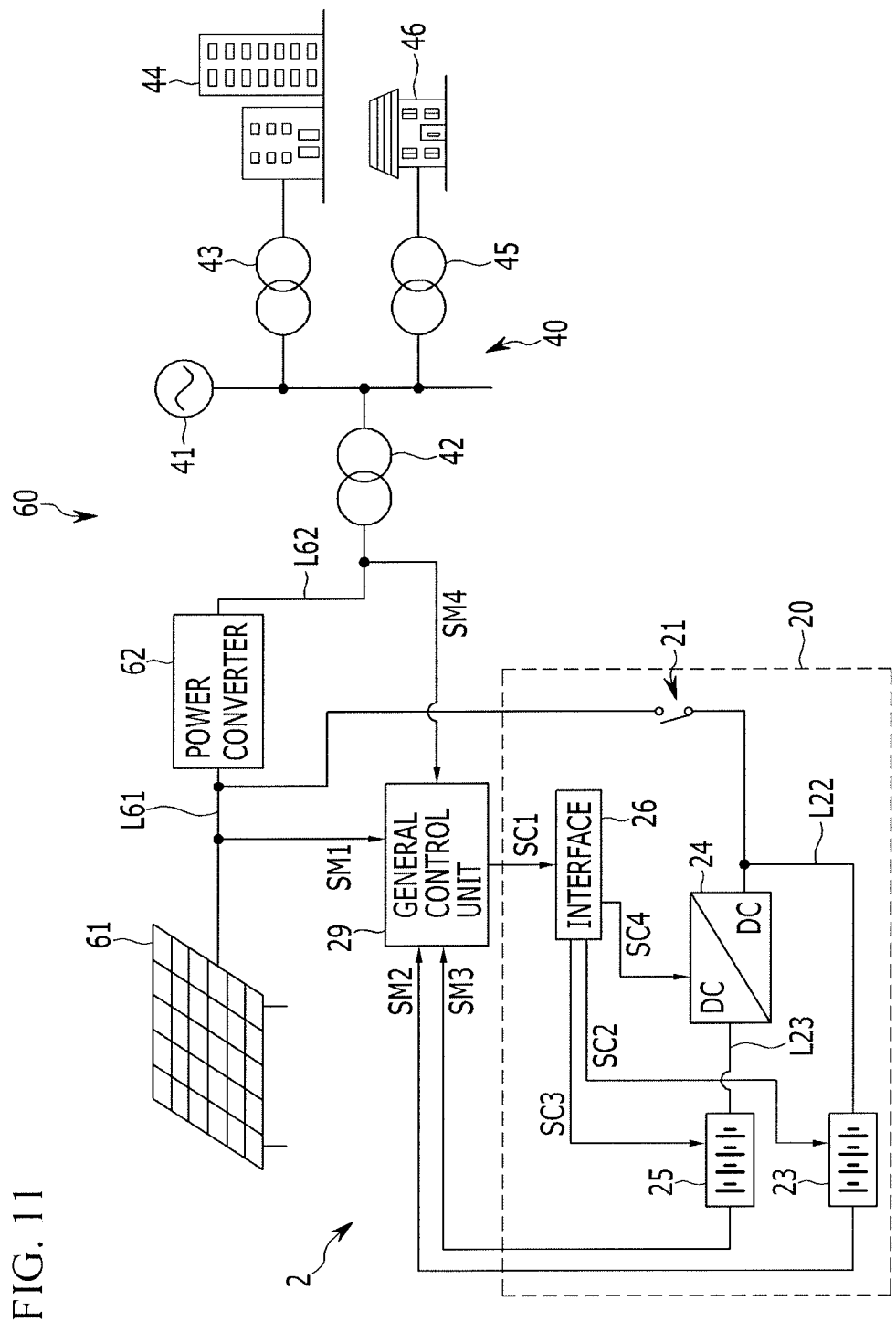
FIG. 11 illustrates another embodiment of wind power generation system and power assist system.

FIG. 11 illustrates another embodiment of a wind power generation system and a power assist system in which the power assist system 2 has been applied to a solar power generation system 60, e.g., another type of natural energy power generation system. The solar power generation system 60 generates DC power from natural light (e.g. sunlight) and outputs the DC power to a main line L61. The solar power generation system 60 includes a photovoltaic panel 61 and a power conversion unit 62 to receive power generated by the photovoltaic panel 61 through the main line L61, transform the received power into AC power, and output the AC power to the main line L62. The main line L62 is connected to a system 40 through a transformer 42.

The power assist system 2 includes the power assist unit 20 connected to the main line L61, and the general control unit 29 configured to generally control the power assist unit 20. The power assist unit 20 may have the same configuration as any of the previous embodiments.

The general control unit 29 receives a first power detection signal SM1 indicative of the power situation of the main line L61 before assist power according to the power assist system 2 (the power assist unit 20) is supplied, and outputs a general control signal SC1 to the interface unit 26 of the power assist unit 20.

Furthermore, the general control unit 29 receives a second power detection signal SM4 indicative of the power situation of the main line L62 through which AC power transformed by the power conversion unit 62 after the power assist operation of the power assist unit 20 is performed is transmitted, and monitors a power situation after the power assist operation, that is, monitors whether a desired power assist operation has been performed. Control performed by the general control unit 29 may be the same as in any of the previous embodiments.

By this configuration, a power assist operation may be realized and power generated by the solar power generation system may be stably supplied to the system.

The cycle of a change of output power in the solar power generation system may be longer than that in the wind power generation system. For example, the rate of a charging and discharging cycle for the power assist system is lower than that for the wind power generation system, e.g., the charging and discharging cycle of the solar power generation system may be several tens of minutes to several days.

The power assist system 2 of this embodiment may be applied to a power generation apparatus having such a charging and discharging cycle of a low rate. Accordingly, a storage cell including the power assist unit and the power assist system may have a long life cycle.

Another Embodiment

FIG. 1 illustrates an example in which a single wind power generation system 10 has been connected to the system. However, even if a plurality of wind power generation systems 10 are connected to the system 40, the power assist system 2 (the power assist unit 20) in accordance with one or more embodiments may be applied.

For example, if a plurality of wind power generation systems 10 are connected to the system 40 through the respective transformers 42, the respective power assist units 20 may only be connected to the main lines L12 of the respective wind power generation systems 10. In this case, a single general control unit 29 may generally control all the power assist units 20, or a general control unit 29 may be installed in each of the power assist units 20 so that the power assist units 20 are individually controlled. The power assist units 20a and 20b may be connected to some or all of the wind power generation systems 10.

Another Embodiment

Figure 12:
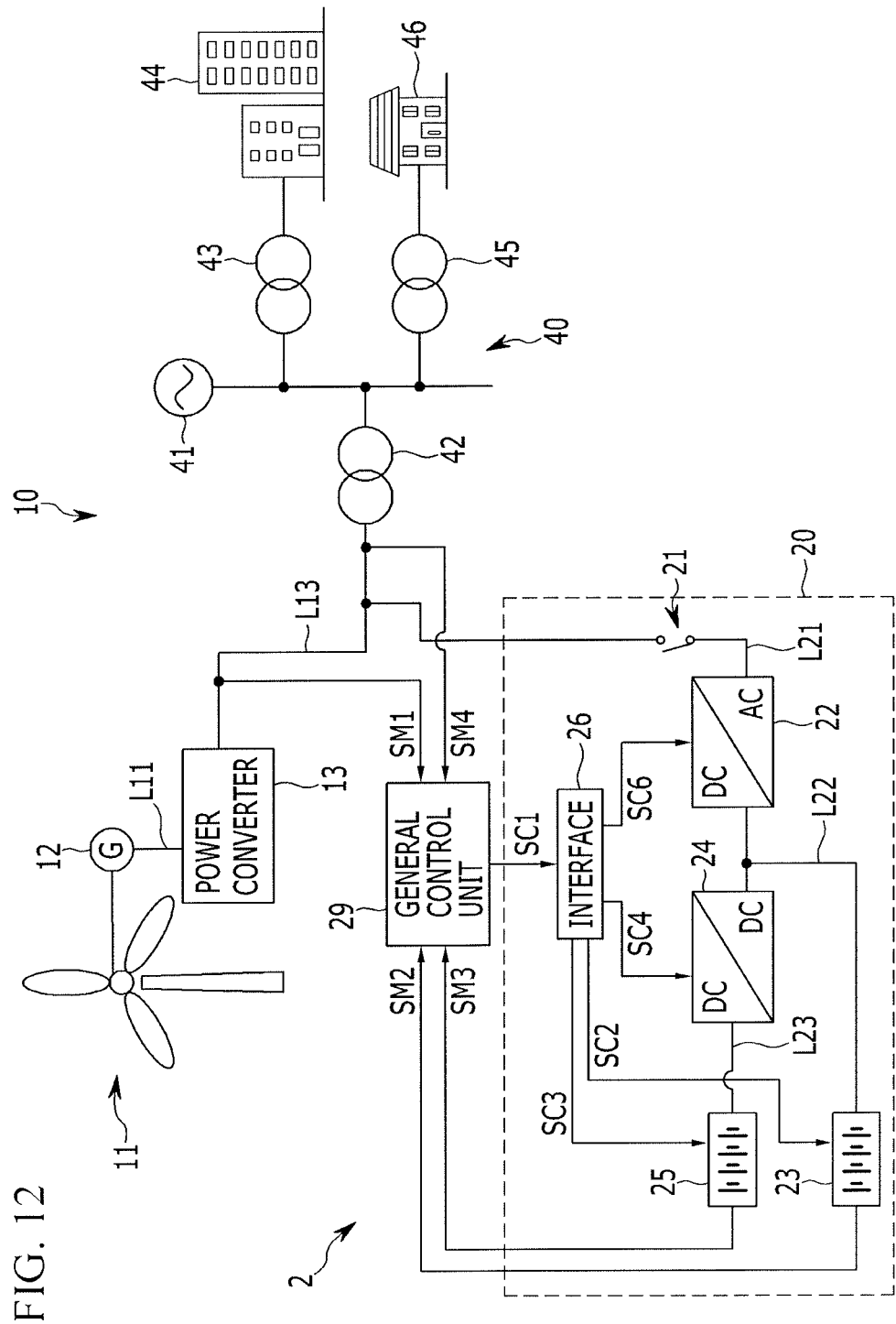
FIG. 12 illustrates another embodiment of wind power generation system and power assist system.

FIG. 12 illustrates another embodiment of a wind power generation system. The present exemplary embodiment is different from the aforementioned embodiments in that a power assist unit 20 is connected to a main line L13 through which AC power is transmitted after power is converted by a power conversion unit 13.

In the present exemplary embodiment, the wind power generation system may include a circuit breaker 21 having one end connected to the main line L13 of the wind power generation system 10, an inverter 22 connected to the other end of the circuit breaker 21 through a power line L21, a branch power line L22 connected to the downstream side of the inverter 22, a first cell bank 23, that is, a first power storage device connected to the branch power line L22, a power assist DC/DC converter 24 connected to the branch power line L22, a second cell bank 25, that is, a second power storage device connected to the downstream side of the power assist DC/DC converter 24, and an interface unit 26.

The first cell bank 23 corresponds to charging and discharging of a high rate, and may be formed of lithium ion cells, for example. The terminal voltage of the first cell bank 23 may be, for example, 800 V.

The second cell bank 25 corresponds to charging and discharging of a high rate, and may be formed of lithium ion cells, for example. Furthermore, the second cell bank 25 has a terminal voltage that is equal to or smaller than the terminal voltage of the first cell bank 23. For example, if the terminal voltage of the first cell bank 23 is 800 V, the second cell bank 25 has a terminal voltage ranging from 3 V or more and 600 V or less. The terminal voltage of the second cell bank 25 is not limited to 600 V or less. For example, the terminal voltage of the second cell bank 25 may exceed 600 V. For example, the terminal voltage of the second cell bank 25 may be the same as the terminal voltage of the first cell bank 23.

The power assist DC/DC converter 24 is connected to the output terminal of the second cell bank 25, and performs the function of raising its output terminal voltage and connecting the output terminal voltage to the branch power line L22. Accordingly, an input voltage range of the power assist DC/DC converter 24 is set to a range according to a predetermined range of the terminal voltage of the second cell bank 25.

The inverter 22 is connected between the branch power line L22 and the power line L21, and performs DC/AC conversion. The voltage of the power line L21 may be 380 V to 480 V, for example.

The circuit breaker 21 changes the cut-off/conduction of the main line L13 of the wind power generation system 10 and the power line L21 of the power assist unit 20. Accordingly, when the power assist unit 20 performs a power assist operation (e.g., when the first cell bank 23 and/or the second cell bank 25 perform a charging and discharging operation), the circuit breaker 21 conducts the main line L13 and the power line L21.

When an overcurrent is generated or an abnormality is generated, for example, when an abnormal voltage, such as a surge attributable to a lightning strike, is generated, the circuit breaker 21 cuts off the connection between the main line L13 and the power line L21 automatically or under the control of the general control unit 29.

By adopting such a configuration, as in the first exemplary embodiment, the storage capacity of the second cell bank 25 may be flexibly changed, and rest times are automatically simultaneously set in the first cell bank 23 and the second cell bank 25. As a result, in the power assist operation of the wind power generation system 10, although charging and discharging of a high rate are performed on the first cell bank 23 and the second cell bank 25, a long life cycle of a cell bank may be realized compared to a case where a rest time is not set.

In the power assist unit 20 of FIG. 12, the circuit breaker 21 is optional and the same advantage may be obtained even if the circuit breaker 21 is not included in the power assist unit 20.

In the wind power generation system 10, the synchronous power generator 12 and the power conversion unit 13 may be integrated with a windmill 11. In such a configuration, when the power assist unit 20 is mounted on the wind power generation system 10, there is an advantage in that various tasks (e.g., an installation task, a replacement task, maintenance task, repair task, etc.) may be easily performed.

The general control unit 29 receives a first power detection signal SM1 indicative of the power situation of the main line L13 before assist power according to the power assist system 2 (the power assist unit 20) is supplied, and outputs a general control signal SC1 for controlling the first cell bank 23, the second cell bank 25, the power assist DC/DC converter 24, and the inverter 22 to the interface unit 26.

Furthermore, the general control unit 29 receives a first cell monitoring signal SM2 indicative of a cell voltage, a charging and discharging current, and charging and discharging power from the first cell bank 23, and monitors the charging and discharging situation of the first cell bank 23. Likewise, the general control unit 29 receives a second cell detection signal SM3 indicative of a cell voltage, a charging and discharging current, and charging and discharging power from the second cell bank 25, and monitors the charging and discharging situation of the second cell bank 25.

Furthermore, the general control unit 29 receives a second power detection signal SM4 indicative of the power situation of the main line L13 after the power assist of the power assist unit 20 is performed, and monitors a power situation after the power assist, that is, monitors whether a target power assist operation has been performed.

Power Stabilization Control (Charging and Discharging Control)

In accordance with at least one embodiment, a predetermined pattern for a charging and discharging command based on a normal distribution relationship is supplied from the general control unit 29 to the first cell bank 23 and the second cell bank 25, because the width of a change of power from the wind power generation system 10 to system 40 is limited within a predetermined range, e.g., in P1 of FIG. 2B. An example of charging and discharging control performed by the general control unit 29 is described in detail below.

Charging and Discharging Control

First, the general control unit 29 receives the first power detection signal SM1 and calculates a charging and discharging pattern for stabilizing the output power of the wind power generation system 10 based on the first power detection signal SM1. For example, the general control unit 29 compares the first power detection signal SM1 with a profile waveform, selects a predetermined pattern (e.g., a waveform shape) used in the charging and discharging pattern, and simultaneously calculates a charging and discharging capacity and a charging and discharging cycle applied to the charging and discharging pattern.

The waveform shape selected by the general control unit 29 as the predetermined charging and discharging pattern may include a square wave, a triangle wave, or a triangle wave approximation, for example, if charging and discharging control based on a DC waveform on the downstream side of the inverter 22 is performed.

Furthermore, if charging and discharging control based on an AC waveform on the upstream side of the inverter 22 is performed, the waveform shape may include a sine wave.

First to Fifth Charging and Discharging Patterns

If a square wave, a triangle wave, or a triangle wave approximation has been selected as the charging and discharging pattern based on a DC waveform on the downstream side of the inverter 22, the general control unit 29 may perform control, such as control from the [first charging and discharging pattern 1] to the [fifth charging and discharging pattern] described in the first exemplary embodiment.

For example, the general control unit 29 selects the charging and discharging pattern based on the first power detection signal SM1, segments the charging and discharging pattern, and generates a first cell control pattern for controlling the first cell bank 23 and a second cell control pattern for controlling the second cell bank 25.

Thereafter, the general control unit 29 outputs the general control signal SC1 to which information about the first and second cell control patterns and information about a power conversion unit control pattern have been added to the interface unit 26.

The interface unit 26 outputs a first cell control signal SC2, that is, a charging and discharging command generated based on the general control signal SC1 received from the general control unit 29, to the first cell bank 23.

Furthermore, the interface unit 26 outputs a second cell control signal SC3, that is, a charging and discharging command generated likewise, to the second cell bank 25.

Furthermore, the interface unit 26 outputs a converter control signal SC4, that is, the on/off control command of the power assist DC/DC converter 24 generated based on the general control signal SC1 received from the general control unit 29, to the power assist DC/DC converter 24. Likewise, the interface unit 26 outputs an inverter control signal SC6, that is, the on/off control command of the inverter 22 generated based on the general control signal SC1 received from the general control unit 29, to the inverter 22.

Examples of detailed charging and discharging patterns have already been illustrated in FIGS. 3 to 7, and the general control unit 29 may perform control such as that of the first exemplary embodiment.

In this case, in control from the [first charging and discharging pattern] to the [fifth charging and discharging pattern], the general control unit 29 outputs an inverter control signal SC6 that controls the inverter 22 so that it is turned on to the inverter 22 in the period in which the charging and discharging pattern of FIG. 3A, 4A, 5A, 6A, or 7A has been output, that is, when the first cell bank or the second cell bank performs a charging and discharging operation.

If a charging and discharging operation is not performed on any one of the first cell bank 23 and the second cell bank 25, the general control unit 29 outputs the inverter control signal SC6 that stops the inverter 22 (e.g., that controls the inverter 22 so that it is turned off) to the inverter 22. Accordingly, the general control unit 29 may control the first cell bank 23, the second cell bank 25, the power assist DC/DC converter 24, and the inverter 22 together through the interface unit 26.

Furthermore, the driving ratio of the inverter 22 may be reduced because the inverter 22 is controlled to be turned off when a charging and discharging operation is not performed on any one of the first cell bank 23 and second cell bank 25. Accordingly, the entire efficiency of the power assist unit 20 may be improved.

Sixth Charging and Discharging Pattern

FIGS. 13A to 13D and 14A to 14D illustrate examples of waveforms in which a sine wave is selected as the charging and discharging pattern based on an AC waveform on the upstream side of the inverter 22. For example, the general control unit 29 selects the charging and discharging pattern applied to the upstream side of the inverter 22 based on the first power detection signal SM1.

Figure 13A:
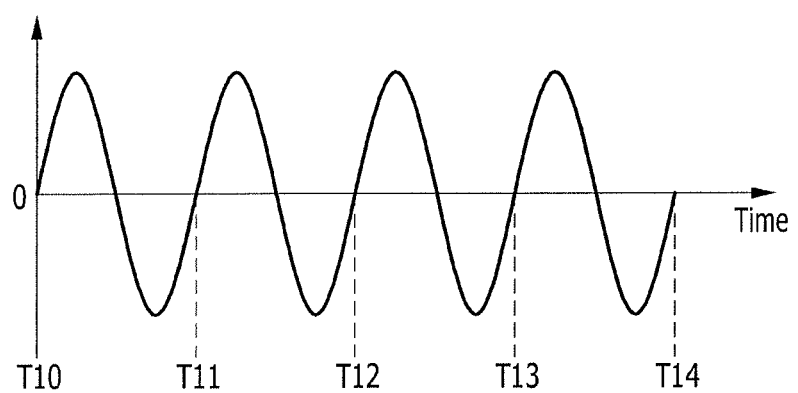
FIGS. 13A to 13D illustrate example waveforms of a charging and discharging pattern.

FIG. 13A illustrates an example in which a sine wave has been selected as the waveform shape and a 1 cycle period T10 to T11 of charging and discharging has been calculated as 10 min. Thereafter, the general control unit 29 generates a DC charging and discharging pattern, that is, a base for controlling the first cell bank 23 and the second cell bank 25, so that the AC waveform on the upstream side of the inverter 22 becomes a calculated charging and discharging pattern (e.g., the sine wave).

Figure 13B:
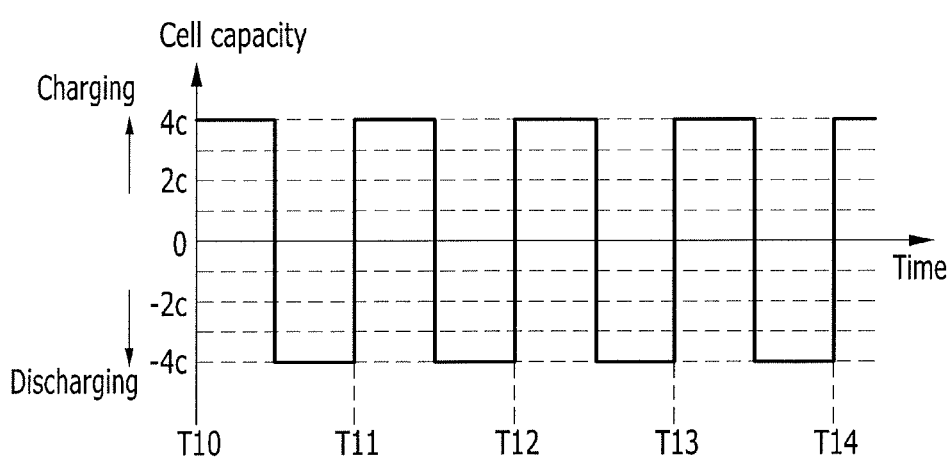

FIG. 13B illustrates an example in which the general control unit 29 has selected a square wave as a DC charging and discharging pattern for controlling the first cell bank 23 and the second cell bank 25 and has generated a square wave charging and discharging pattern. Furthermore, FIG. 14B illustrates an example in which the general control unit 29 has selected a triangle wave approximation as a DC charging and discharging pattern for controlling the first cell bank 23 and the second cell bank 25, has generated a triangle wave (refer to a triangular line of FIG. 14B) according to a sine wave, and has generated a triangle wave approximation (refer to a solid line of FIG. 14B) based on the triangle wave.

Figure 13C:
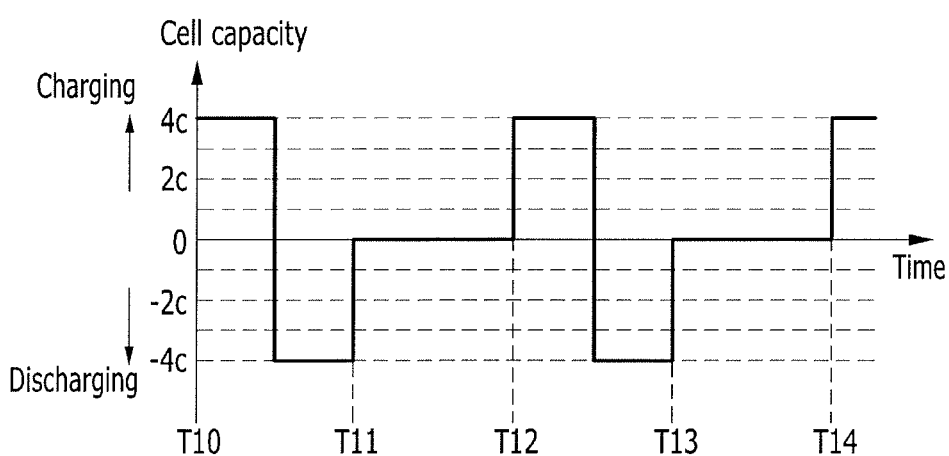
Figure 13D:
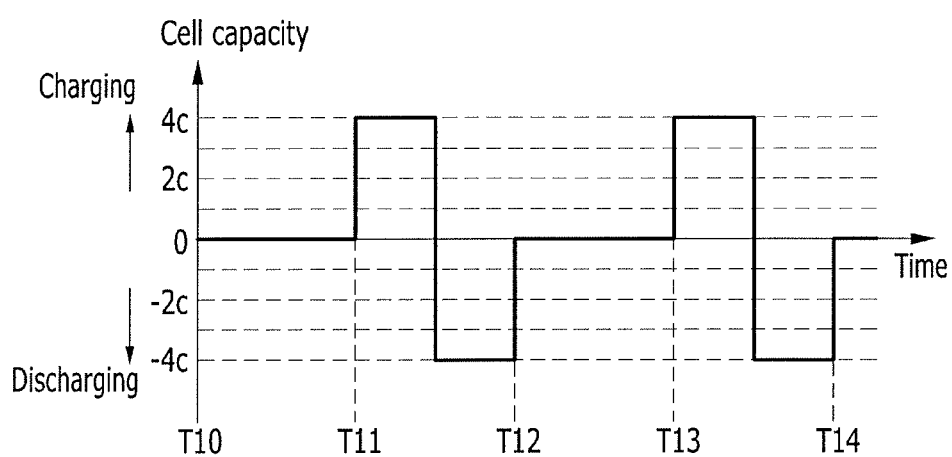

Control of the first cell bank 23, the second cell bank 25, and the power assist DC/DC converter 24 by the general control unit 29 in FIGS. 13B to 13D is the same as that illustrated in the examples of FIGS. 3A to 3C.

Furthermore, in this case, the general control unit 29 outputs the inverter control signal SC6 for controlling the inverter 22 so that it is turned on to the inverter 22 because it performs a charging and discharging operation on any one of the first cell bank and the second cell bank.

Figure 14A:
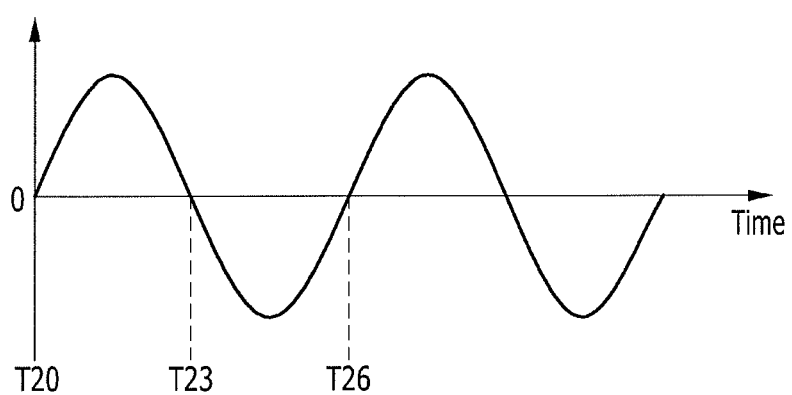
FIGS. 14A to 14D illustrate example waveforms of another charging and discharging pattern.
Figure 14B:
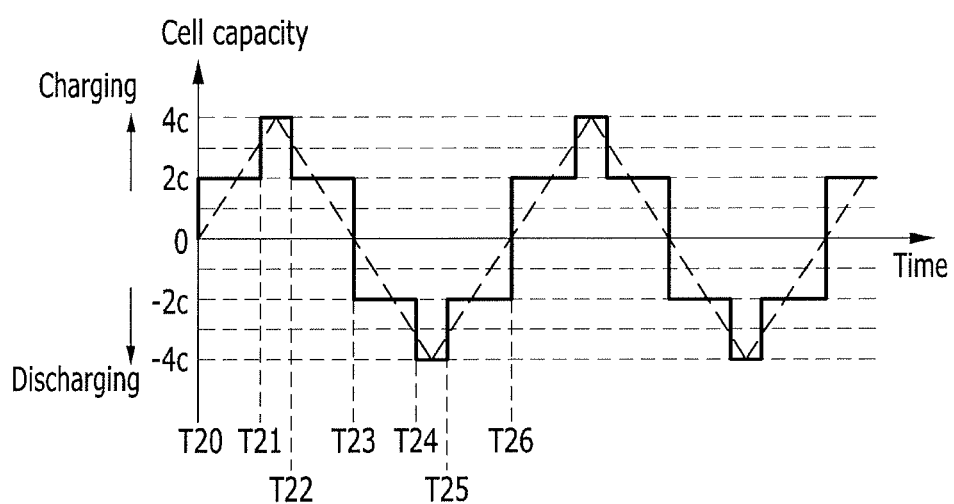
Figure 14C:
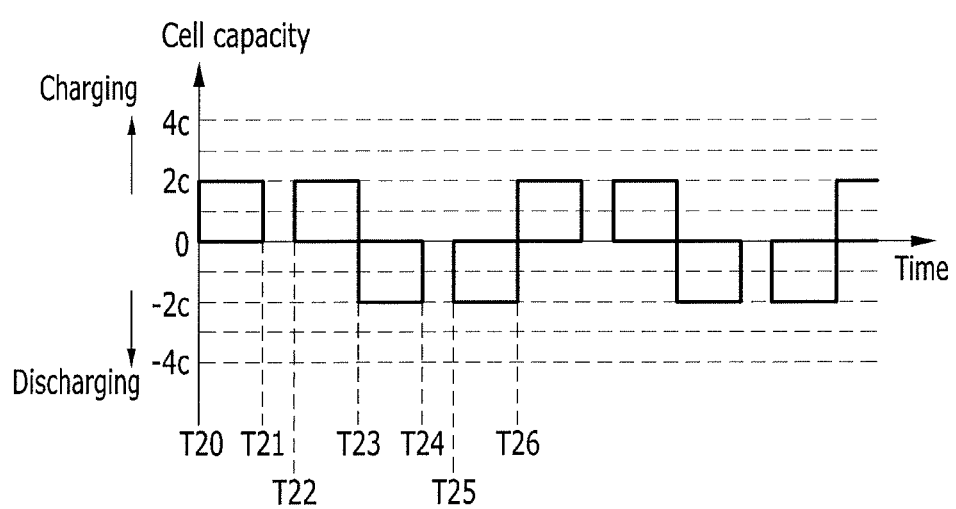
Figure 14D:
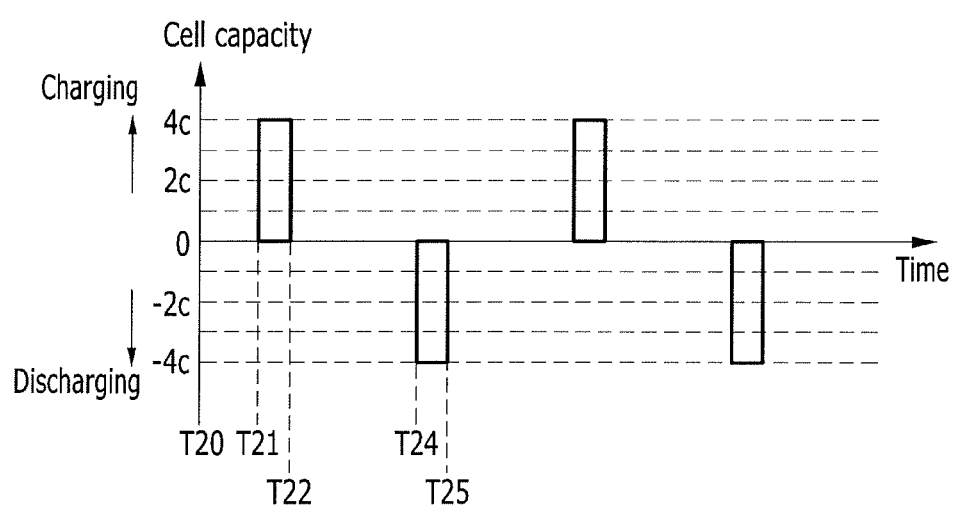

Control of the first cell bank 23, the second cell bank 25, and the power assist DC/DC converter 24 by the general control unit 29 in FIGS. 14B to 14D is the same as that illustrated in the examples of FIGS. 4A to 4C.

Furthermore, in this case, the general control unit 29 outputs the inverter control signal SC6 for controlling the inverter 22 so that it is turned on to the inverter 22 because it performs a charging and discharging operation on any one of the first cell bank and the second cell bank.

By performing such control, the charging and discharging power of the first cell bank 23 and the charging and discharging power of the second cell bank 25 are combined, and thus charging and discharging power, such as that illustrated in FIG. 13A or 14A, is transmitted to the power line L21. For example, charging and discharging power, such as that illustrated in FIG. 13A or 14A, is transmitted from the power assist unit 20 to the main line L13, and thus a power assist operation based on a result of a comparison between the first power detection signal SM1 and the profile waveform is performed. Accordingly, a change of the output power of a natural energy power generation system may be absorbed.

In such a power assist operation, the general control unit 29 performs charging and discharging control so that a rest time is set in each of the first cell bank 23 and the second cell bank 25. Accordingly, although charging and discharging of a high rate is performed, a long life cycle of a cell bank may be realized compared to a case where such control is not performed.

Furthermore, in control illustrated in FIGS. 14B to 14D, the general control unit 29 charges and discharges the first cell bank 23 in SOC of 50% or less (a section of SOC or 0% or more to 50% or less) while setting a rest time in the first cell bank 23.

By performing such charging and discharging control, the life cycle of a cell bank may be extended compared to a case where charging and discharging are performed in SOC of 50% or more (a section including SOC of 50% or more), for example, in SOC of 100% (in a section of SOC of 0% or more to 100% or less) or SOC of 50% (a section of SOC of 50% or more to 100% or less).

The general control unit 29 charges and discharges the second cell bank 25 in SOC of 100% (a section of SOC of 0% or more to 100% or less), but performs control so that a longer rest time is set in second cell bank 25 that in the first cell bank 23. For example, in the present exemplary embodiment, the general control unit 29 controls the rest time so that it is quadrupled with respect to a charging and discharging period.

By performing such control, charging and discharging are performed in SOC of 100% (a section of SOC of 0% or more to 100% or less), and simultaneously the entire life cycle of the first cell bank 23, the second cell bank 25, and the power assist unit 20 including the first and the second cell banks may be extended.

The general control unit 29 has been illustrated as controlling the rest time so that a quadruple rest time is provided in the second cell bank 25 with respect to a charging and discharging period. However, if a rest time longer than that of the first cell bank 23 has only to be set in the second cell bank 25, the rest time may be shorter than the quadruple or may exceed the quadruple. Even in such a case, a long life cycle of the power assist unit 20 may be achieved.

Another Embodiment

Figure 15:
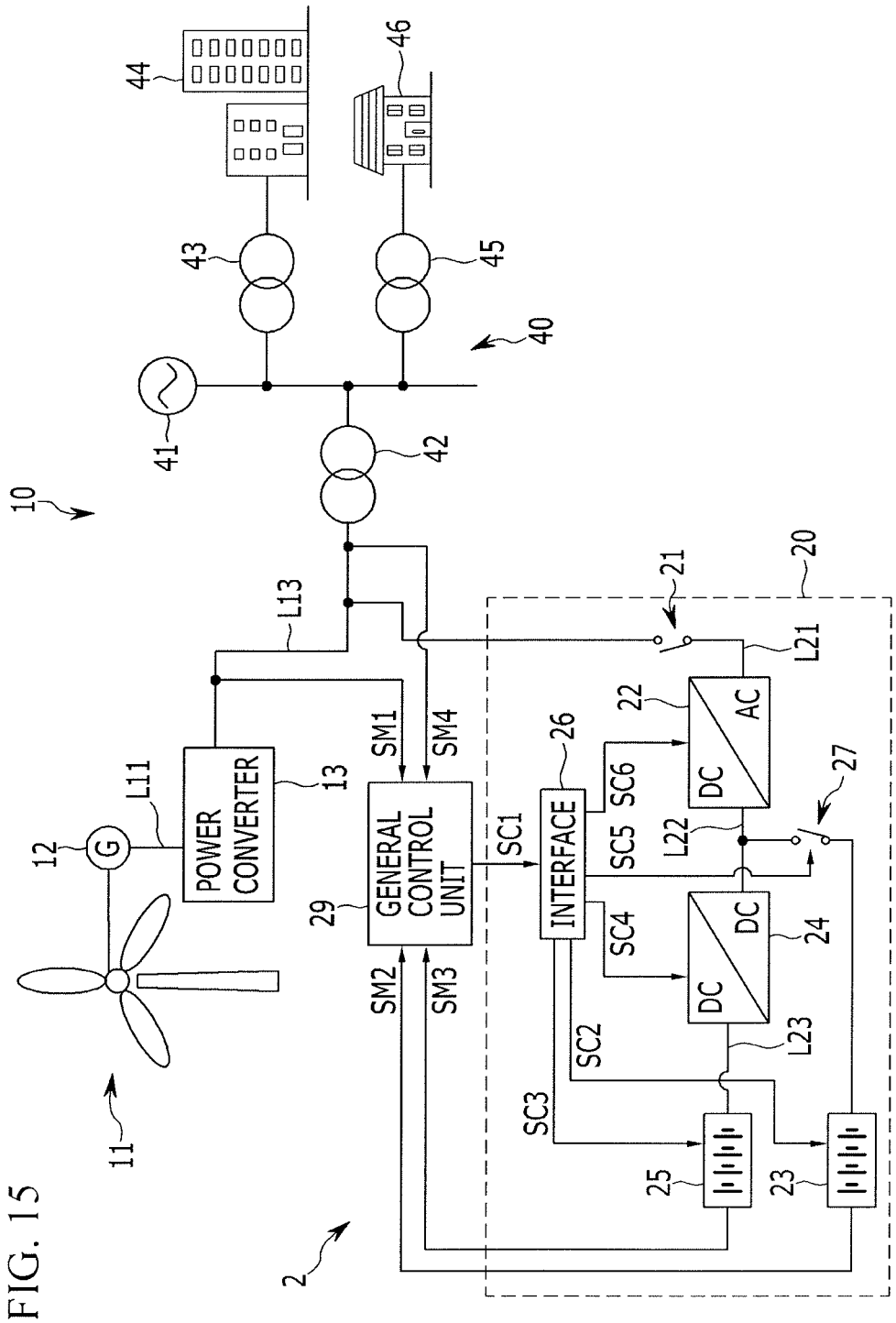
FIG. 15 illustrates another embodiment of a wind power generation system and the power assist system.

FIG. 15 illustrates another embodiment of a wind power generation system and a power assist system. The power assist unit 20 of FIG. 15 is different from that of FIG. 12 in that a DC circuit breaker 27 is installed in the branch power line L22 that belongs to power lines after a branch and that is placed on the part of the first cell bank 23. Also, interface unit 26 outputs a breaker control signal SC5 for controlling the cut-off/conduction of the DC circuit breaker 27 so that the DC circuit breaker 27 is turned on or off based on the general control signal SC1 generated by the general control unit 29.

For example, the DC circuit breaker 27 is configured to change cut-off/conduction between the branch power line L22 and the first cell bank 23 based on the breaker control signal SC5 from the interface unit 26 and conducts the branch power line L22 and the first cell bank 23 when the first cell bank 23 performs a charging and discharging operation.

If the first cell bank 23 stops its charging and discharging operation, the DC circuit breaker 27 cuts off the connection between the branch power line L22 and the first cell bank 23. Charging and discharging control on the power assist unit 20 by the general control unit 29 may be performed like the aforementioned charging and discharging control.

As described above, the charging and discharging of the first cell bank 23 may be performed based on the first cell control signal SC2. Since the connection of the first cell bank 23 may be physically cut off by installing the DC circuit breaker 27, the propagation of power between the branch power line L22 and the first cell bank 23 may be certainly blocked when the first cell bank 23 does not perform a charging and discharging operation.

Another Embodiment

Figure 16:
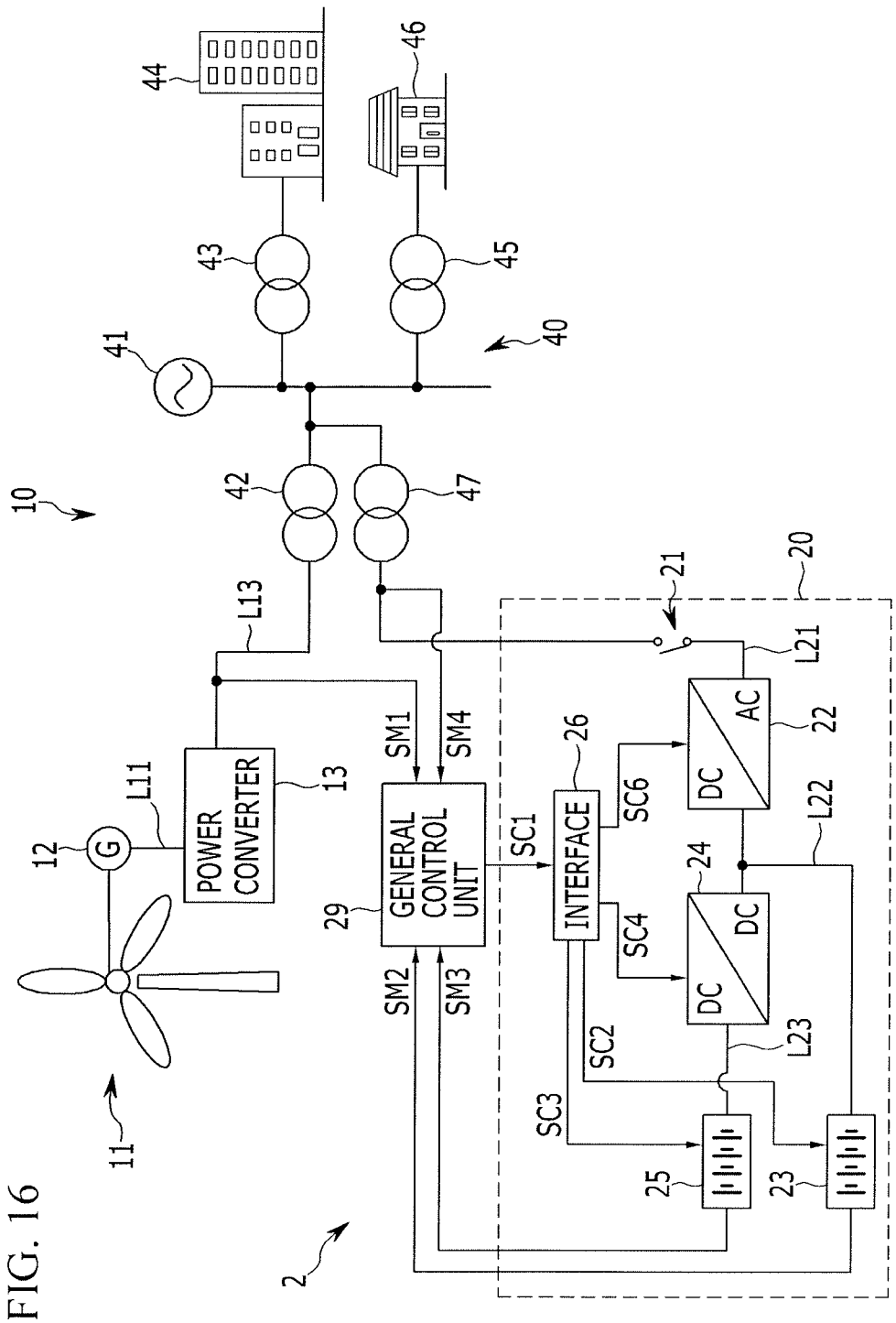
FIG. 16 illustrates another embodiment of a wind power generation system and the power assist system.

FIG. 16 illustrates another embodiment of a wind power generation system and a power assist system. The power assist unit 20 of this embodiment is different from that of FIG. 12 in that the power assist unit 20 may be directly connected to the system 40. For example, the power assist unit 20 is directly connected to the system 40 because the power line L21 of the power assist unit 20 is connected to the system 40 through a circuit breaker 21 and a transformer 47.

In this embodiment, the general control unit 29 receives the first power detection signal SM1 indicative of the power situation of the main line L13 that connects the power conversion unit 13 of the wind power generation system 10 and the transformer 42, and outputs the general control signal SC1 for controlling the first cell bank 23, the second cell bank 25, the power assist DC/DC converter 24, and the inverter 22 to the interface unit 26.

Furthermore, the general control unit 29 receives the second power detection signal SM4 indicative of a power situation after the power assist of the power assist unit 20 is performed from a power line that connects the power assist unit 20 and the transformer 47, and monitors a power situation after the power assist, that is, monitors whether a desired power assist operation has been performed.

In this embodiment, if the power line L21 of the power assist unit 20 and the system 40 have the same voltage value, the power assist unit 20 may be directly connected to the system 40 without the transformer 47.

Another Embodiment

Figure 17:
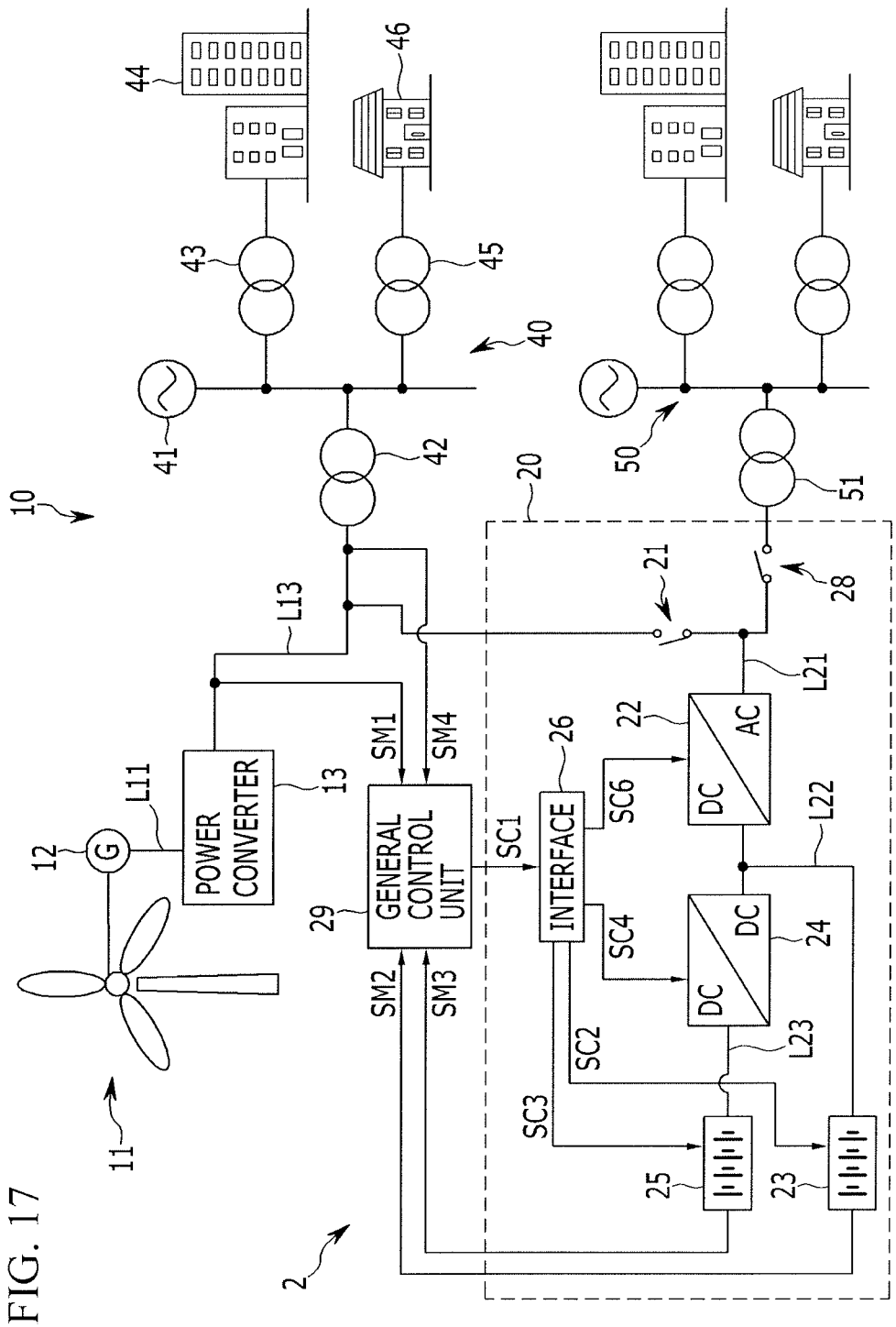
FIG. 17 illustrates another embodiment of a wind power generation system and the power assist system.

FIG. 17 illustrates another embodiment of a wind power generation system and a power assist system. The power assist unit 20 of this embodiment is different from that of FIG. 12 in that the power assist unit 20 is configured to be connected to a second system 50 different from the system 40. For example, the power assist unit 20 is connected to the second system 50 because the power line L21 of the power assist unit 20 is connected to the second system 50 through a transformer 51.

Furthermore, a circuit breaker 28 is formed between the power line L21 and the transformer 51, and the connection between the power line L21 and the transformer 51 is configured to be conducted/cut off. When a normal operation is performed, the circuit breaker 28 cuts off the connection between the power line L21 and the transformer 51.

For example, when an abnormality, such as when power supplied from the wind power generation system 10 to the system 40 is stopped or when the power source 41 for the system of the system 40 is lost, the circuit breaker 21 cuts off the connection between the main line L12 and the branch power line L22 automatically or under the control of the general control unit 29 (a control line). The circuit breaker 28 conducts the power line L21 and the transformer 51 automatically or under the control of the general control unit 29 (a control line).

Accordingly, when a normal operation is performed, a power assist operation from the power assist system 2 to the wind power generation system 10 is performed. When an abnormal state is generated, power may be supplied from at least any one of the first cell bank 23 and the second cell bank 25 to the second system 50 through the power line L21 and the transformer 51. For example, this may be used as an emergency power source when an abnormal state is generated.

Another Embodiment

Figure 18:
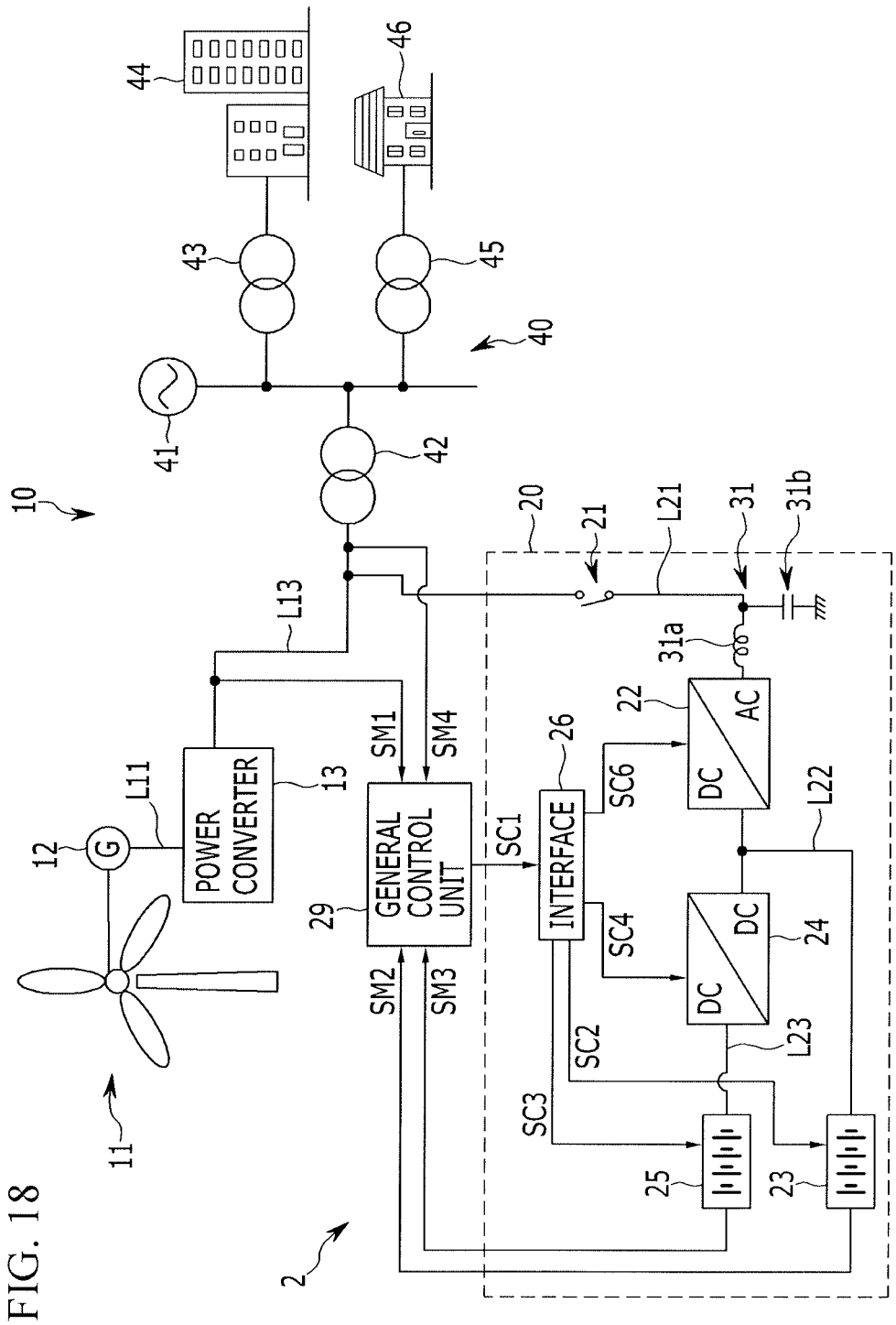
FIG. 18 illustrates another embodiment of a wind power generation system and the power assist system.

FIG. 18 illustrates another embodiment of a wind power generation system and a power assist system. The power assist unit 20 of this embodiment is different from that of FIG. 12 in that a filter circuit 31 is installed in the power line L21 of the power assist unit 20. The filter circuit 31 may include an inductor 31a installed between the inverter 22 and the circuit breaker 21 and a capacitor 31b installed between the power line L21 and the ground. Accordingly, the assist power of the power assist unit 20 may be smoothed.

If there is no problem of a ripple being generated, for example, if a filter function using another circuit or configuration is included or in the case of an environment in which it is difficult for a ripple to occur in assist power, the filter circuit 31 may be omitted from the configuration.

Another Embodiment

Figure 19:
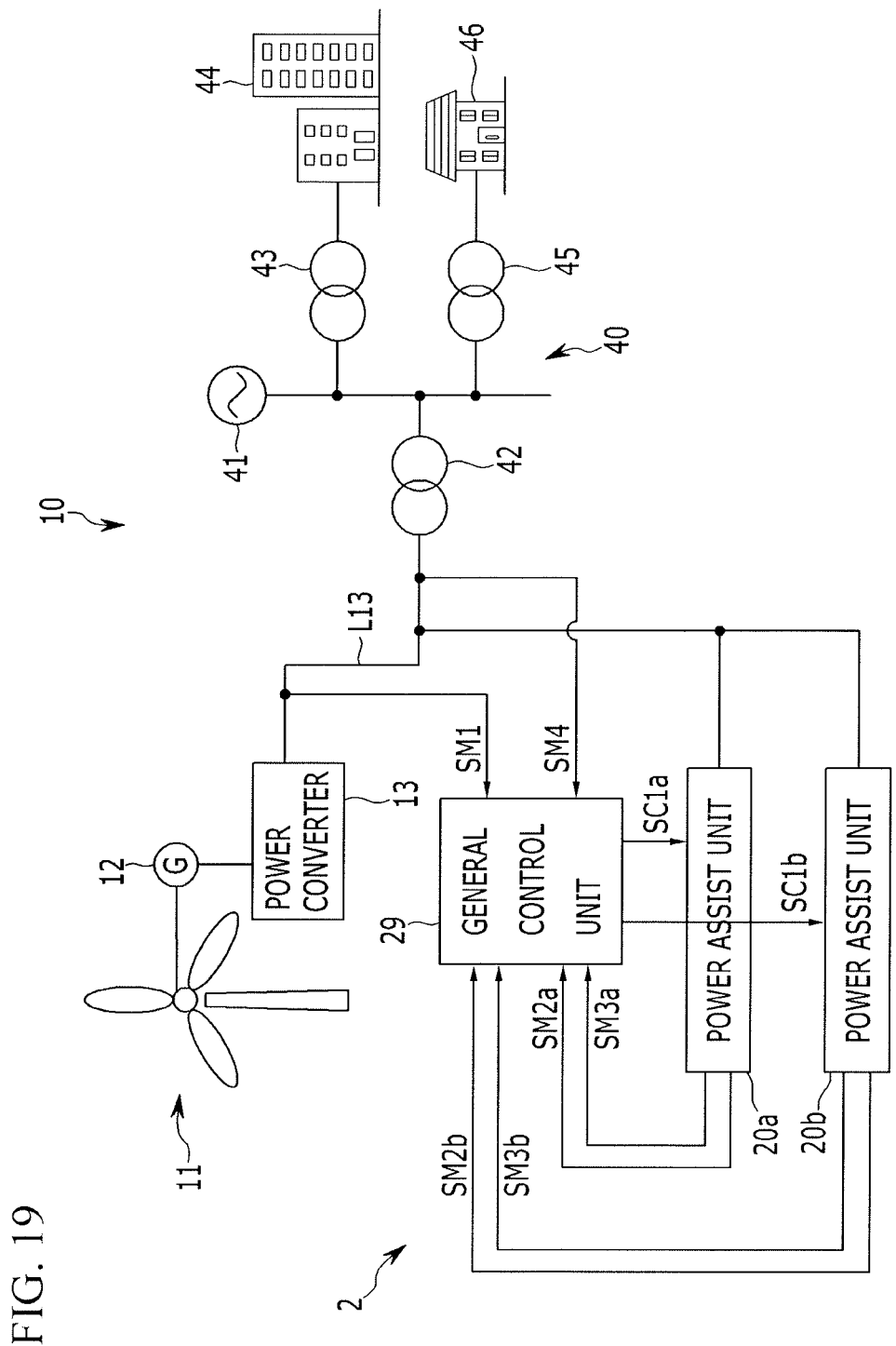
FIG. 19 illustrates another embodiment of a wind power generation system and the power assist system.

FIG. 19 illustrates another embodiment of a wind power generation system and a power assist system in which two power assist units are connected to the wind power generation system. For example, the power assist system 2 may include power assist units 20a and 20b connected to the main line L13 of the wind power generation system 10 illustrated in FIG. 12 and the general control unit 29. For example, the two power assist units 20a and 20b are connected in parallel to the main line L13 of the wind power generation system 10. Each of the power assist units 20a and 20b may have the same configuration as the power assist unit 20 illustrated in FIG. 12.

The general control unit 29 receives the first power detection signal SM1 indicative of the power situation of the main line L13 before assist power according to the power assist system 2 (the power assist unit 20) is supplied, and outputs a general control signal SC1a to the interface unit of the power assist unit 20a. Likewise, the general control unit 29 outputs a general control signal SC1b to the interface unit of the power assist unit 20b.

Accordingly, the general control unit 29 may generally control first cell banks, power assist DC/DC converters, and second cell banks in the two power assist units 20a and 20b. Furthermore, the general control unit 29 receives a first cell monitoring signal SM2a and a second cell detection signal SM3a from the power assist unit 20a, and receives a first cell monitoring signal SM2b and a second cell detection signal SM3b from the power assist unit 20b.

Accordingly, the general control unit 29 may monitor the cell voltages, charging and discharging currents, and charging and discharging power of the first cell bank 23 and the second cell bank 25 included in each of the two power assist units 20a and 20b together. The general control unit 29 may perform control based on each of pieces of information, for example, information about the charging and discharging of the first cell banks 23 or the second cell banks 25 and information about the driving of power storage devices. Accordingly, control performance according to the general control unit 29 may be improved.

FIG. 19 illustrates an example in which the two power assist units 20*a* and 20*b* are connected in parallel to the main line L13 of the wind power generation system 10. In another embodiment, three or more power assist units 20 may be connected in parallel to the main line L13 of the wind power generation system 10.

Even in this case, through a configuration such as that of FIG. 9, the general control unit 29 may generally control the power assist units 20 and may monitor the cell voltages of the first cell bank 23 and the second cell bank 25 included in each of the power assist units 20 together.

Another Embodiment

Figure 20:
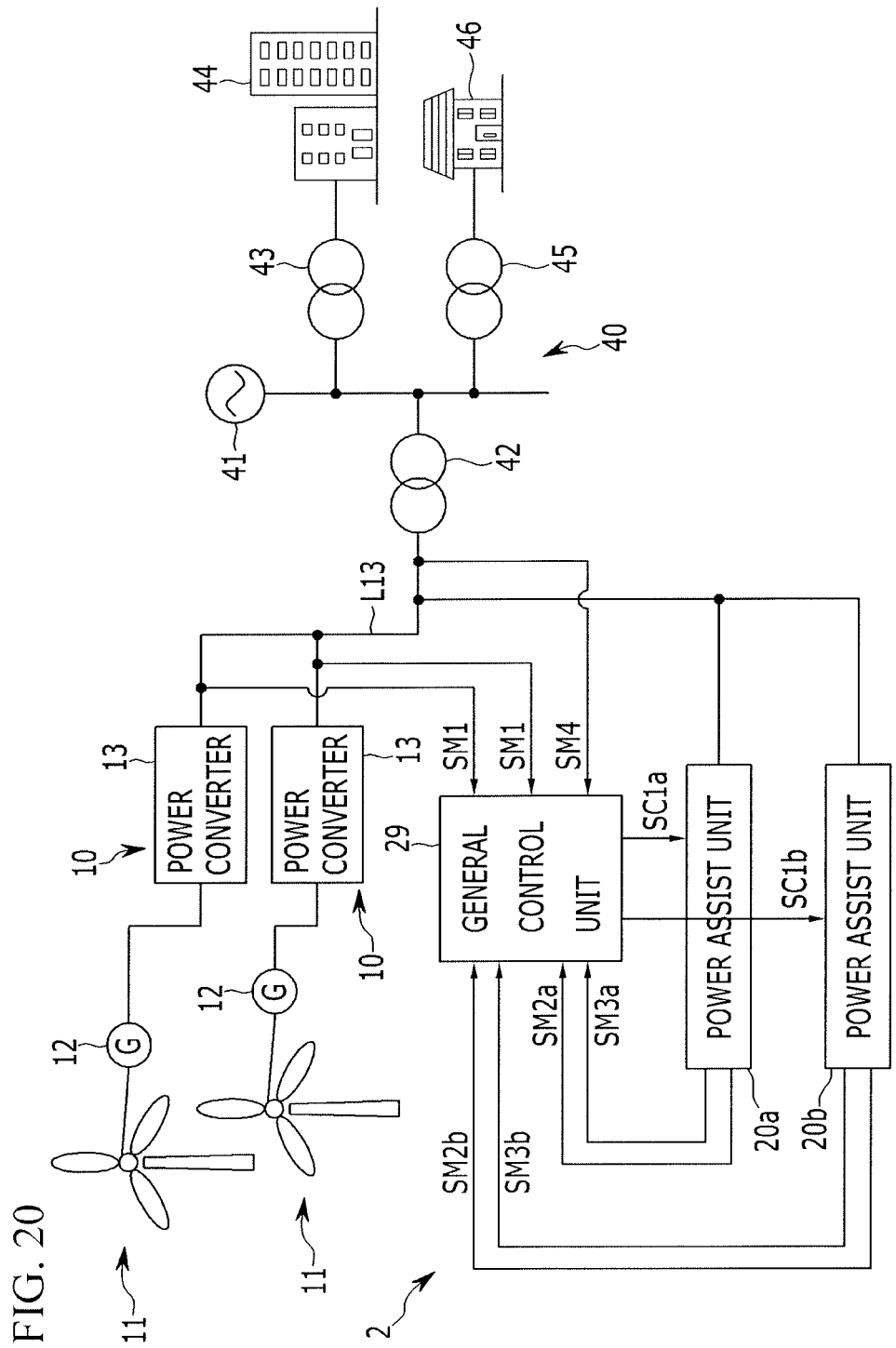
FIG. 20 illustrates another embodiment of a wind power generation system and the power assist system.

FIG. 20 illustrates another embodiment of a wind power generation system and a power assist system in which two wind power generation systems are installed and two power assist units are connected to the two wind power generation systems. For example, a plurality of wind power generation systems 10 are connected to the main line L13, and the main line L13 is connected to the system 40 through the transformer 42.

The power assist system 2 has the same configuration as the power assist system 2 of FIG. 19. FIG. 20 is different from FIG. 19 in that the general control unit 29 receives the first power detection signal SM1 from each of the plurality of wind power generation systems 10. Accordingly, although the plurality of wind power generation systems 10 are connected to the system 40, the power assist system 2 (the power assist unit 20) in accordance with the present invention may be applied.

If the plurality of wind power generation systems 10 are connected to the system 40 through the transformer 42, the power assist units 20 have only to be connected to the main line L13 of the respective wind power generation systems 10. In this case, as illustrated in FIG. 19 or 20, a plurality of the power assist units 20*a* and 20*b* may be connected to some or all of the plurality of wind power generation systems 10.

Another Embodiment

FIG. 12 illustrates an example in which the power assist system 2 is applied to the wind power generation system 10 including the synchronous power generator 12. In another embodiment, a wind power generation system or solar power generation system including an induction power generator may be applied to the wind power generation system and the power assist system.

For example, if the power assist system 2 in accordance with one or more of the aforementioned embodiments is applied to the wind power generation system 10 including the induction power generator 14 illustrated in FIG. 10, for example, the power assist unit 20 has only to be connected to the main line L14 of the wind power generation system 10 illustrated in FIG. 10.

In the present exemplary embodiment, the general control unit 29 receives the first power detection signal SM1 indicative of the power situation of the main line L14 before assist power according to the power assist system 2 (the power assist unit 20) is applied and outputs the general control signal SC1 to the interface unit 26 of the power assist unit 20. Furthermore, the general control unit 29 receives the second power detection signal SM4 indicative of the power situation of the main line L14 through which AC power is transmitted after the power assist of the power assist unit 20 is performed, and monitors a power situation after the power assist, that is, monitors whether a desired power assist operation has been performed.

Detailed control performed by the general control unit 29 may be the same as that of the second exemplary embodiment. For example, if the power assist system 2 in accordance with the second exemplary embodiment is applied to the solar power generation system 60 illustrated in FIG. 11, for example, the power assist unit 20 has only to be connected to the main line L62 of the solar power generation system 60.

In the present exemplary embodiment, the general control unit 29 receives the first power detection signal SM1 indicative of the power situation of the main line L62 before assist power according to the power assist system 2 (the power assist unit 20) is supplied and outputs the general control signal SC1 to the interface unit 26 of the power assist unit 20.

Furthermore, the general control unit 29 receives the second power detection signal SM4 indicative of the power situation of the main line L62 through which AC power is transmitted after the power assist of the power assist unit 20 is performed, and monitors a power situation after the power assist, that is, monitors whether a target power assist operation has been performed. Control performed by the general control unit 29 may be the same as that of any of the previous embodiments.

Other Embodiments

In the configuration of FIG. 1, the branch power line may be connected to another DC system and the power assist system may be used as an emergency power source when an abnormal state is generated. In the configuration of FIG. 8, the DC circuit breaker 27 installed in the branch power line L22 may also be applied to the power assist unit 20 of FIGS. 9 to 11.

Furthermore, the general control unit 29 has been illustrated as controlling the first cell bank 23, the second cell bank 25, and the power assist DC/DC converter 24 together through the interface unit 26 in one or more of the aforementioned embodiments. In another embodiment, the functions of the general control unit 29 and the interface unit 26 may be integrated, and the integrated general control unit 29 may directly control the first cell bank 23, the second cell bank 25, and the power assist DC/DC converter 24 together.

In another embodiment, the functions of the general control unit 29 and the interface unit 26 may be integrated, and the integrated general control unit 29 may directly control the first cell bank 23, the second cell bank 25, the power assist DC/DC converter 24, and the inverter 22 together.

In one or more of the previous embodiments, the power assist system 2 (the power assist unit 20) has been illustrated as being applied to the wind power generation system or the solar power generation system. In another embodiment, the power assist system 2 (the power assist unit 20) may be applied to a natural energy power generation system for supplying power generated by natural energy to a system. For example, if the power assist system 2 (the power assist unit 20) in accordance with the present invention is applied to a water power generation system or a water pumping power generation system, a hydraulic turbine rotated by water power may be used instead of the windmill 11 of FIG. 1. The remaining constituent elements may be the same as those of FIG. 1.

Accordingly, even the water power generation system or the water pumping power generation system, there are advantages in that a change of the output power of a natural energy power generation system may be absorbed and the life cycles of the first cell bank and the second cell bank and a long life cycle of the entire power assist unit may be realized.

The control units and other processing features of the disclosed embodiments may be implemented in logic which, for example, may include hardware, software, or both. When implemented at least partially in hardware, the control units and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the control unit and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A power assist apparatus, comprising:
    a branch power line connected to a main line of a natural energy power generation system which is connected to a first system;
    a first power storage device connected to the branch power line;
    a power assist DC/DC converter connected to the branch power line;
    a second power storage device connected to a downstream side of the power assist DC/DC converter; and
    a controller to control charging and discharging of the first power storage device and second power storage device to be alternately performed based on one or more repeating periodic control patterns and wherein the controller is to provide the one or more control patterns to set a rest time when charging and discharging is to be stopped in at least one of the first power storage device and the second power storage device.

2. The apparatus as claimed in claim 1, wherein:
    the natural energy power generation system includes a rotating body rotated by natural energy, a synchronous power generator to be driven by the rotating body, and a power converter between the synchronous power generator and the system,
    the power converter includes a first inverter to perform AC/DC conversion and a second inverter to perform DC/AC conversion, the first and second inverter connected in series, and
    the branch power line is connected to a DC main line connecting the first and second inverters.

3. The apparatus as claimed in claim 1, wherein:
    the natural energy power generation system includes a rotating body rotated by natural energy, an induction power generator to be driven by the rotating body, and a power converter in a secondary winding of the induction power generator,
    the power converter includes a first inverter to perform AC/DC conversion and a second inverter to perform DC/AC conversion, the and second inverters connected in series, and
    the branch power line is connected to a DC main line connecting the first and second inverters.

4. The apparatus as claimed in claim 1, wherein the first power storage device has a higher output voltage than the second power storage device.

5. The apparatus as claimed in claim 1, further comprising:
    a DC circuit breaker in a power line corresponding to power lines after a branch from the branch power line, the DC circuit breaker placed on the first power storage device side to electrically conduct or cut off the first power storage device and the branch power line.

6. The apparatus as claimed in claim 1, wherein:
    the main line includes an AC main line, and
    the power assist apparatus includes an inverter connected to the AC main line, the branch power line connected to a downstream side of the inverter and to the AC main line through the inverter.

7. The apparatus as claimed in claim 6, wherein:
    the inverter is connected to a second system different from the first system, and
    when power supplied from the natural energy power generation system to the first system is stopped or power supplied to the first system is stopped, the power is to be supplied from at least one of the first power storage device or the second power storage device to the second system through the inverter.

8. The apparatus as claimed in claim 1, wherein the natural energy power generation system includes:
    a general controller to output a general control signal to control charging and discharging of the first power storage device and the second power storage device;
    an interface to receive the general control signal, generate a first cell control signal to control the charging and discharging of the first power storage device based on the general control signal, output the first cell control signal to the first power storage device, generate a second cell control signal to control the charging and discharging of the second power storage device, and output the second cell control signal to the second power storage device, and wherein:

first charging and discharging control and second charging and discharging control are controlled so that the first charging and discharging control and the second charging and discharging control are alternately selected, wherein the first charging and discharging control and the second charging and discharging control are to be controlled by the general controller through the interface, and wherein:

the first charging and discharging control includes charging and discharging a first device of the first power storage device and the second power storage device when driven and simultaneously charging and discharging a second device of the first power storage device and the second power storage device when stopped, and the second charging and discharging control includes charging and discharging the second device when driven and simultaneously charging and discharging the first device when stopped.

9. The apparatus as claimed in claim 8, wherein:

the general control signal output by the general controller includes a converter control command to perform on/off control on the power assist DC/DC converter, and the interface is to output a converter control signal to control the power assist DC/DC converter to the power assist DC/DC converter based on the converter control command.

10. The apparatus as claimed in claim 1, wherein the controller is to alternately perform first charging and discharging control and second charging and discharging control, wherein:

the first charging and discharging control includes charging and discharging a first device of the first power storage device and the second power storage device when driven and simultaneously charging and discharging a second device of the first power storage device and the second power storage device when stopped, and the second charging and discharging control includes charging and discharging of the second device when driven and simultaneously the charging and discharging of the first device when stopped.

11. The apparatus as claimed in claim 10, wherein the controller is to:

charge and discharge the first device and stop the charging and discharging of the second device so that SOC becomes Q1% or less in the first charging and discharging control, and charge and discharge the second device and stop the charging and discharging of the first device so that the SOC becomes Q2% or less in the second charging and discharging control, wherein Q1<Q2 =100 are satisfied, and wherein a time of the second charging and discharging control is less than a time of the first charging and discharging control.

12. The apparatus as claimed in claim 10, wherein the general controller is to:

receive a power monitoring signal indicative of a state of the power, calculate a charging and discharging command waveform of a triangle wave corresponding to assist power of the branch power line based on the power monitoring signal, segment the triangle wave into a first charging and discharging command to be applied to the first charging and discharging control and a second charging and discharging command to be applied to the second charging and discharging control, and control the first and second power storage devices.

13. The apparatus as claimed in claim 10, wherein the controller is to perform:

third charging and discharging control in which Q1=50, the first device of the first power storage device and the second power storage device is charged and discharged so that SOC of the first device becomes Q1% or less, and simultaneously charging and discharging of the second device are stopped, fourth charging and discharging control in which Q1+Q2=100, the first device is charged and discharged so that the SOC of the first device becomes Q1% or less, and simultaneously the second device is charged and discharged so that the SOC of the second device becomes Q1% or more to Q2% or less, and fifth charging and discharging control in which the first charging and discharging control and the second charging and discharging control are combined and sixth charging and discharging control in which the third charging and discharging control and the fourth charging and discharging control are combined at a predetermined ratio.

14. The apparatus as claimed in claim 1 wherein the controller is to alternately perform first charging and discharging control and second charging and discharging control, and wherein:

in the first charging and discharging control, a first device of the first power storage device and the second power storage device is charged and discharged so that the first device has SOC of Q1% or less, where Q1=50 is satisfied, and charging and discharging of a second device of the first power storage device and the second power storage device are stopped, and in the second charging and discharging control, the first device is charged and discharged so that Q1+Q2=100 is satisfied and the SOC of the first device becomes Q1% or less, and the second device is charged and discharged so that the SOC of the second device becomes Q1% or more to Q2% or less.

15. The apparatus as claimed in claim 1, wherein the controller is to control charging and discharging of the first power storage device and the second power storage device, wherein the general controller is to alternately perform first charging and discharging control and second charging and discharging control, and wherein:

in the first charging and discharging control, a first device of the first power storage device and the second power storage device is charged and discharged so that the first device has SOC of Q1% or less, where Q1=50 is satisfied, and charging and discharging of a second device of the first power storage device and the second power storage device are stopped, and in the second charging and discharging control, the first device is charged and discharged so that Q1+Q2=100 is satisfied and the SOC of the first device becomes Q1% or less and the second device is charged and discharged so that the SOC of the second device becomes Q1% or more to Q2% or less.

16. The apparatus as claimed in claim 15, wherein the controller is to:

receive a power monitoring signal indicative of a state of the generated power, and calculate a charging and discharging command waveform corresponding to assist power of the branch power line based on the power monitoring signal and perform the first charging and discharging control and the second charging and discharging control so that a charging and discharging waveform of the branch power line becomes the charging and discharging command waveform.

17. The apparatus as claimed in claim 16, wherein the general controller is to:
   segment a triangle wave approximation based on a combination of triangle waves and square waves having an amplitude and a charging and discharging cycle calculated based on the power monitoring signal,
   generate a first charging and discharging command to be applied to the first charging and discharging control and a second charging and discharging command to be applied to the second charging and discharging control and to control the first power storage device and the second power storage device.

* * * * *